United States Patent [19]

Schläfer et al.

[11] Patent Number: 4,806,127
[45] Date of Patent: Feb. 21, 1989

[54] WATER-SOLUBLE DISAZO COMPOUNDS, CONTAINING TRIAZINYL PYRIDINIUM GROUP PROCESSES FOR THEIR PREPARATION AND THEIR USE FOR DYEING CELLULOSE

[75] Inventors: Ludwig Schläfer, Kelkheim; Hartmut Springer; Reinhard Hähnle, both of Königstein/Taunus, all of Fed. Rep. of Germany

[73] Assignee: Hoechst Aktiengesellschaft, Frankfurt am Main, Fed. Rep. of Germany

[21] Appl. No.: 90,222

[22] Filed: Aug. 27, 1987

[30] Foreign Application Priority Data

Aug. 30, 1986 [DE] Fed. Rep. of Germany ....... 3629574

[51] Int. Cl.$^4$ ..................... C09B 43/40; C09B 62/51; D06P 3/70; D06P 1/38
[52] U.S. Cl. .......................... 8/549; 8/543; 8/547; 8/686; 8/687; 8/688; 8/918; 8/532; 534/617; 534/619; 534/629
[58] Field of Search ..................... 8/549, 547, 686, 532

[56] References Cited

U.S. PATENT DOCUMENTS

| | | | |
|---|---|---|---|
| 4,300,902 | 11/1981 | Connor | 8/529 |
| 4,323,497 | 4/1982 | Hoyer et al. | 534/631 |
| 4,453,945 | 6/1984 | Miyamoto et al. | 8/543 |
| 4,485,041 | 11/1984 | Hoyer et al. | 534/637 |
| 4,626,589 | 12/1986 | Omura et al. | 534/605 |

FOREIGN PATENT DOCUMENTS

| | | |
|---|---|---|
| 1207756 | 7/1986 | Canada. |
| 0167219 | 1/1986 | European Pat. Off.. |
| 2008143 | 5/1979 | United Kingdom. |
| 2007698 | 4/1982 | United Kingdom. |
| 2122634 | 1/1984 | United Kingdom. |

Primary Examiner—A. Lionel Clingman

[57] ABSTRACT

Water-soluble disazo compounds conforming to the general formula (1)

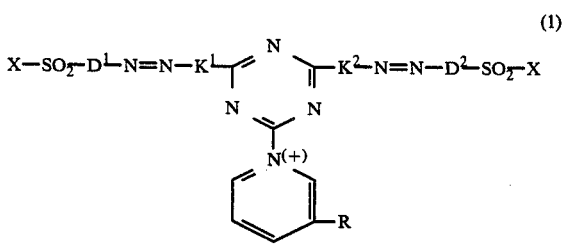

(1)

and their 1:1 copper complex compounds which possess useful fiber-reactive dye properties and are capable of dyeing carboxamido- and/or hydroxy-containing materials, in particular cellulose fibers, in fast shades; wherein:

$D^1$ and $D^2$ are each a phenylene, which may be substituted, or a naphthylene optionally substituted by sulfo; in the case of the copper complex compounds the ortho-position in $D^1$ or $D^2$ or in both being substituted by an oxy group complex-bonded to the copper, or $D^1$ is a radical of the formula (2a), (2b) or (2c)

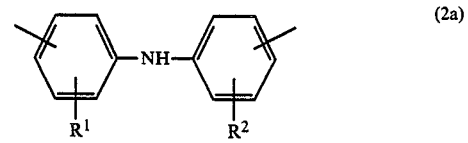

(2a)

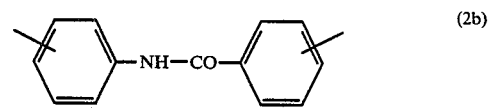

(2b)

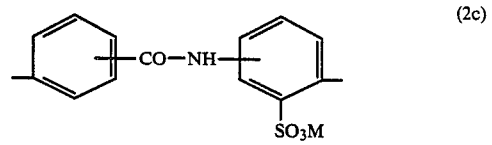

(2c)

or $D^2$ is a radical which is the reverse of formulas (2a), (2b) or (2c), in which
$R^1$ and $R^2$ are each independently of the other hydrogen, nitro, sulfo, methyl, ethyl, methoxy or ethoxy;
$K^1$ is a radical of the formula (3a), (3b) or (3c)

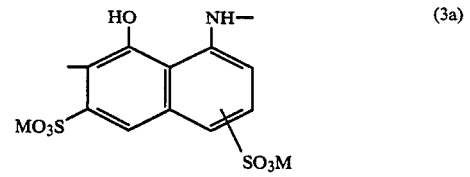

(3a)

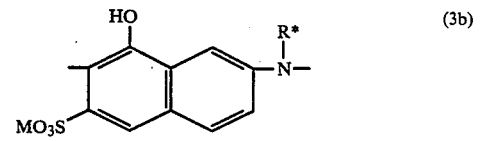

(3b)

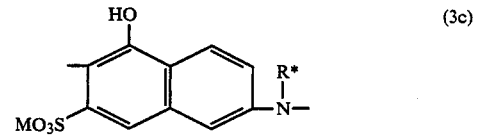

(3c)

and $K^2$ is a radical which is the reverse of the formulas (3a); (3b) or (3c)
in which M is hydrogen or an alkali metal and $R^*$ is hydrogen, methyl or ethyl, where in the case of the copper complex compounds the naphtholic hydroxy groups are complex bonded to the copper atom;
X is vinyl, $\beta$-sulfatoethyl or $\beta$-chloroethyl;
R is carboxy or carbamoyl.

13 Claims, No Drawings

WATER-SOLUBLE DISAZO COMPOUNDS, CONTAINING TRIAZINYL PYRIDINIUM GROUP PROCESSES FOR THEIR PREPARATION AND THEIR USE FOR DYEING CELLULOSE

The present invention is in the technical field of textile dyes.

Cellulose fibers and polyester fibers cannot at present be dyed together uniformly and evenly with one and the same dye owing to their different chemical natures. It is necessary to dye blended materials of these two types of fiber, such as, for example, blend fabrics, in a two-stage process, namely first one type of fiber with the dye suitable for that type of fiber, then the other type of fiber with the dye suitable for this second type of fiber, in each case employing different processing conditions. Such a process is necessarily lengthy and in need of replacement. It has therefore been tried to dye such blend fiber materials using a dye mixture of a fiber-reactive dye for dyeing the cellulose fiber portion and a disperse dye for dyeing the polyester fiber portion. However, this procedure has distinct disadvantages. The reason is that fiber-reactive dyes customarily become fixed on the cellulose fiber in an alkaline medium while disperse dyes, and to a certain extent the polyester fiber as well, are customarily sensitive to alkali. The result is consequently that in the course of the fixation of the fiber-reactive dyes in an alkaline medium the disperse dyes present at the same time and in some instances even the polyester fibers can be damaged.

The present invention thus has for its object to reduce or even to eliminate these previously known disadvantages, in particular since the dyeing of blend fabrics, such as, for example, those of cellulose and polyester fibers, is becoming increasingly more important. There is thus also more interest in dyes which facilitate the dyeing of such blend fabrics, in particular fiber-reactive dyes which are capable of becoming fixed on the cellulose fiber in the non-alkaline region and, in addition, can be employed at very low dyeing temperatures.

For instance, it has been proposed in German Offenlegungsschrift No. 2,634,308 and U.S. Pat. No. 4,300,902 to dye such blend fiber materials with dyes which contain one or more s-triazinyl groups having a quaternary nitrogen substituent, such as a pyridinium radical, for example nicotinic acid, and later, according to U.S. Pat. No. 4,453,945, dyes of the same type having specifically the nicotinic acid radical as quaternary nitrogen substituent for use in the dyeing of cellulose fibers and cellulose/polyester blend fibers. These dyes and/or the dyeing methods by which they are to be applied have, however, disadvantages. While the dyes of German Offenlegungsschrift No. 2,634,308 and of U.S. Pat. No. 4,300,902 require dyeing temperatures of over 150° C. and, by contrast, the dyeing method of U.S. Pat. No. 4,453,945, according to the information provided therein, can manage with dyeing temperatures below 150° C., the dyes mentioned in these three publications have the serious disadvantage that their color yield, when the dyes are applied by exhaust methods to cellulose fiber materials, such as cotton, is highly dependent on the pH of the dyebath. Consequently, the depth of shade of dyeings with these known dyes on cotton fibers at pH values between 4 and 8 is highly variable, subject to the general maxim that the depth of shade increases with increasing pH and the maximum depth of shade, as with all conventional fiber-reactive dyes, is in the strongly alkaline region, thus above pH 8. In addition, the buildup of dyeings with these dyes, i.e. the relation between amount of dye used and color yield (depth of shade) obtained on the cellulose fiber, is insufficient, since the color yield on the fiber does not increase any more from certain dye concentrations in the dye bath on increasing the amount of dye to obtain deeper shades.

These defects are also in evidence with the dyes described in European patent application publication No. 0,167,219A, which, in addition to a pyridinium-substituted s-triazinyl radical, contain a fiber-reactive group of the vinylsulfonyl type. The same is true of the dyes described in U.S. Pat. No. 4,323,497 and in British patent specification No. 2,007,698 B.

The present invention now provides novel water-soluble compounds which conform to the general formula (1) mentioned and defined hereinafter and their 1:1 copper complex derivatives, which have fiber-reactive properties and not only can be successfully employed in the alkaline region for dyeing cellulose fibers but also, surprisingly, are capable of undergoing fixing to cellulose fibers even in the weakly acid or neutral range, namely under the conditions of dyeing polyesters fibers at temperatures between 100° and 150° C. in an aqueous medium. As a result of finding the novel dyes of the general formula (1) and their 1:1 copper complex derivatives it has become possible to use the hitherto customary and traditional disperse dyes together with these novel dyes in one-stage dyeing processes for dyeing cellulose/polyester fiber blends where the two fiber components are dyed evenly and with fast results by the respective type of dye and tone-on-tone dyeings can be obtained if the disperse dye employed has the same shade as the fiber-reactive dye.

The fiber-reactive compounds according to the invention conform to the general formula (1)

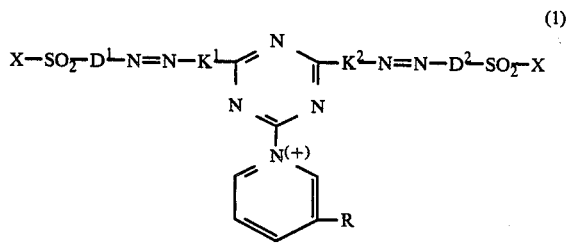

in which the formula members have the following meanings:

$D^1$ is a benzene ring which can be substituted by 1 or 2 substituents which are selected from the set consisting of 2 methyl groups, 2 ethyl groups, 2 methoxy groups, 2 ethoxy groups, 2 sulfo groups, 1 carboxy group, 1 chlorine atom and 1 bromine atom, one of these substituents being bonded to the benzene nucleus in the ortho-position relative to the azo group, or $D^1$ is a naphthalene ring which can be susbstituted by a sulfo group in the ortho-position relative to the azo group, or $D^1$ is a radical of the general formula (2a), (2b) or (2c)

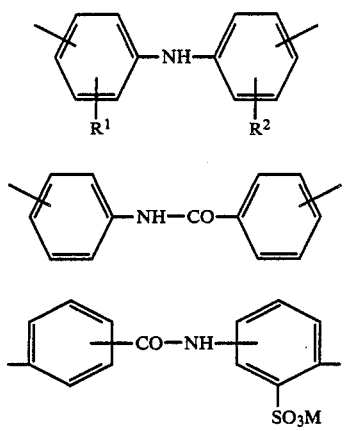 (2a)

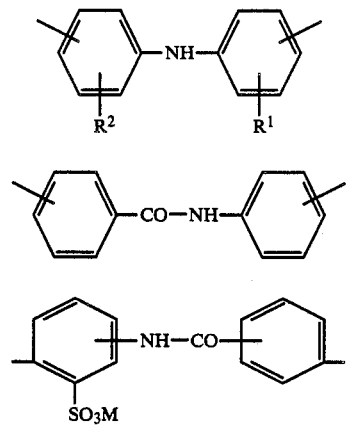 (2b)

(2c)

in which
R¹ denotes a hydrogen atom or a nitro, sulfo, methyl, ethyl, methoxy or ethoxy group, and
R² has one of the meanings of R¹ and is identical to R¹ or different from R¹;
D² is a benzene ring which can be substituted by 1 or 2 substituents which are selected from the set consisting of 2 methyl groups, 2 ethyl groups, 2 methoxy groups, 2 ethoxy groups, 2 sulfo groups, 1 carboxy group, 1 chlorine atom and 1 bromine atom, one of these substituents being bonded to the benzene nucleus in the ortho-position relative to the azo group, or
D² is a naphthalene ring which can be substituted by a sulfo group in the ortho-position relative to the azo group, or
D² is a radical of the general formula (2d), (2e) or (2f)

(2d)

(2e)

(2f)

in which
R¹ denotes a hydrogen atom or a nitro, sulfo, methyl, ethyl, methoxy or ethoxy group, and
R² has one of the meanings of R¹ and is identical to R¹ or different from R¹,
it being possible for D¹ and D² to have meanings identical to or different from each other; or
D¹ or D² or both represent in the case of 1:1 copper complex compounds a formula radical D*, it being possible for the two D*'s to be identical to or different from each other, and each D* denotes a benzene ring which is substituted in the ortho-position relative to the azo group by an oxy group to which the copper atom is complex-bonded, it being possible for this benzene ring to be substituted not only by the —SO₂—X group but additionally by a methyl, ethyl, methoxy, ethoxy, sulfo or carboxy group or a chlorine or bromine atom, or is a naphthalene ring which is substituted in the ortho-position relative to the azo group by an oxy group to which the copper atom is complex-bonded;
K¹ is a radical of the general formula (3a), (3b) or (3c)

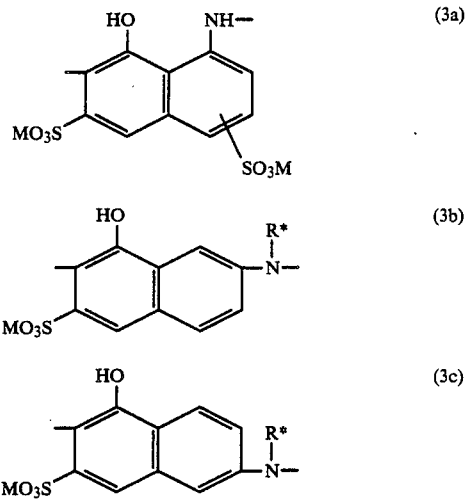

in which
M stands for a hydrogen atom or an alkali metal, such as sodium, potassium or lithium, and
R* is an ethyl group or preferably a hydrogen atom or a methyl group and
the one —SO₃M group in the formula (3a) is in the meta- or para-position relative to the NH group;
K² is a radical of the general formula (4a), (4b) or (4c)

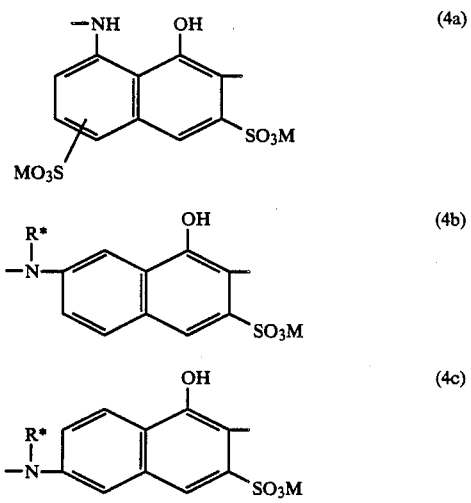

in which
M and R* have the abovementioned meanings and the one —SO₃M group in the formula (4a) is in the meta- or para-position relative to the NH group,
it being possible for K¹ and K² to have a meaning identical to each other or different from each other and in the case of copper complex compounds the naphtholic hydroxy group being complex-bonded as an oxy group to the copper atom;

X is the vinyl group or a β-sulfatoethyl or the β-chloroethyl group, it being possible for the two X's to have meanings identical to each other or different from each other;

R is the carboxy group or the carboxamide group; one of the sulfo and carboxy groups in the radicals R, $D^1$, $D^2$, $K^1$ and $K^2$ forms an anion equivalent to the pyridinium cation.

Preferred compounds of the formula (1) are those conforming to the general formula (1A)

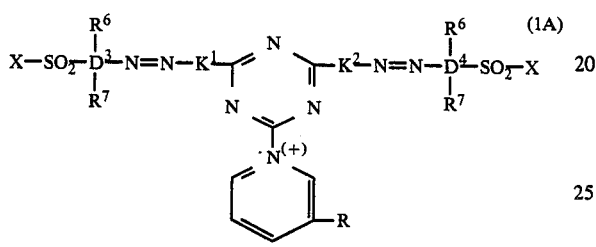

(1A)

in which $D^3$ and $D^4$ have meanings identical to each other or different from each other and each denotes a benzene ring or a naphthalene ring, $R^6$ is, in the case where $D^3$ or $D^4$ denotes a benzene ring, a hydrogen atom or a methyl, ethyl, methoxy, ethoxy, sulfo or carboxy group in the ortho-position relative to the azo group, or a chlorine or bromine atom in the ortho-position relative to the azo group, or, in the case where $D^3$ or $D^4$ denotes a naphthalene ring, a hydrogen atom or a sulfo group in the ortho-position relative to the azo group, $R^7$ denotes a hydrogen atom or a methyl, ethyl, methoxy, ethoxy, nitro or sulfo group, and X, R, $K^1$ and $K^2$ have the abovementioned meanings.

Preference is given in particular to compounds of the general formula (1) where $D^1$ and $D^2$ are each a benzene ring which can be substituted by 1 or 2 substituents which are selected from the set consisting of 2 methoxy groups, 1 methyl group, 1 chlorine atom and 1 bromine atom, one of these substituents being bonded in the ortho-position relative to the azo group, or where $D^1$ and $D^2$ are a naphthalene ring which can be substituted by a sulfo group in the ortho-position relative to the azo group.

Preference is given in addition to compounds of the general formula (1) in which the individual doubly represented formula members have meanings identical to each other. 1:1 copper complex disazo compounds according to the invention are in particular compounds of the general formulae (1a) and (1b), in particular compounds of the general formula (1a)

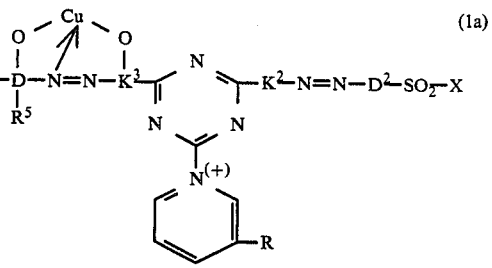

(1a)

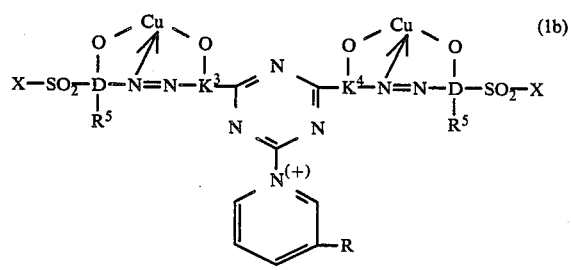

(1b)

in which

X, $D^2$, $K^2$ and R have the abovementioned meanings and

D denotes a benzene or naphthalene ring to which the metal-complexing oxy group is bonded in the ortho-position relative to the azo group, $R^5$ is a hydrogen atom or a methyl, ethyl, methoxy, ethoxy or sulfo group or a chlorine atom if D denotes a benzene ring, or $R^5$ is a hydrogen atom if D denotes a naphthalene ring, it being possible in the formula (1b) for the two D's and the two $R^5$'s respectively to have a meaning identical to or different from each other, $K^3$ is a radical of the general formula (5a), (5b) or (5c)

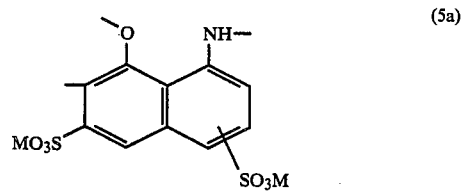

(5a)

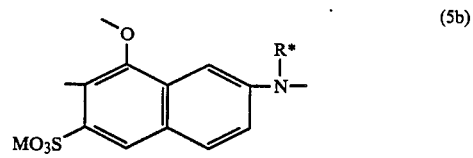

(5b)

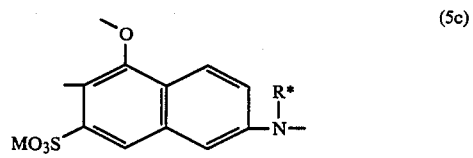

(5c)

in which

M and R* have the abovementioned meanings and $K^4$ is a radical of the general formula (6a), (6b) or (6c)

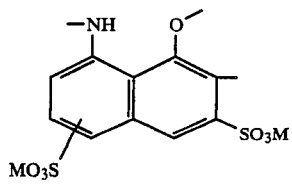
(6a)
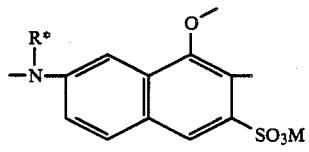
(6b)
(6c)
in which
M and R* have the abovementioned meanings,
it being possible for $K^3$ and $K^4$ to have meanings identical to each other or different from each other.
Of the disazo compounds according to the invention, preferred compounds are in particular those of the general formulae (11a), (11b), (11c), (11d), (11e), (11f), (11g) and (11h):
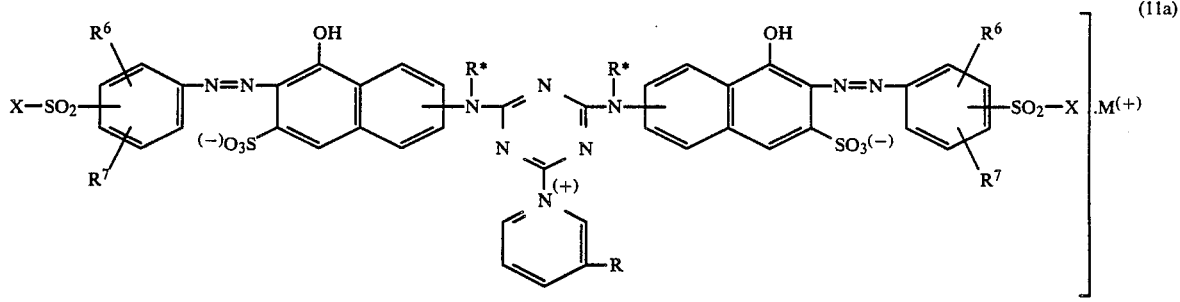
(11a)
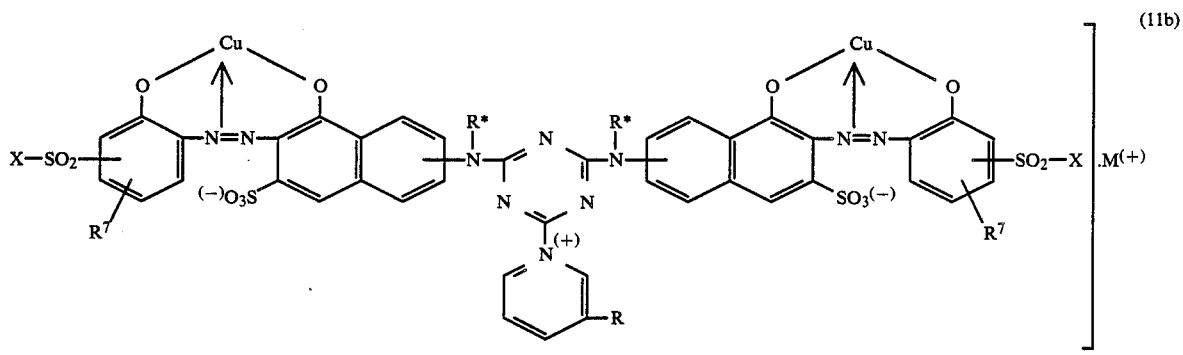
(11b)
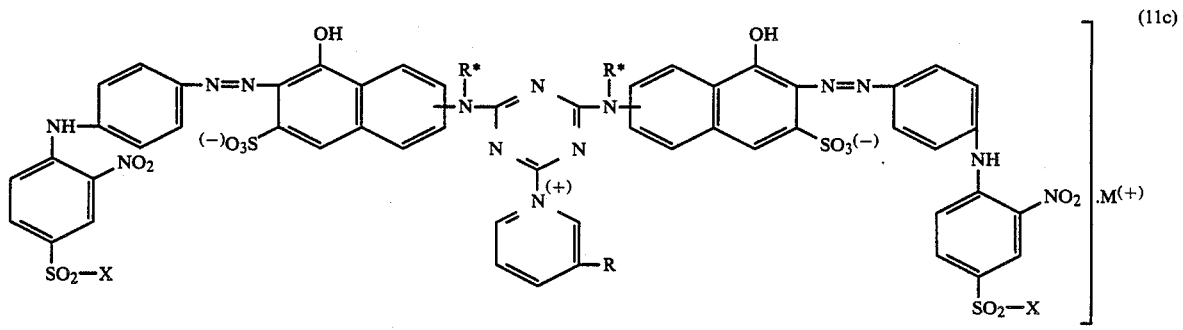
(11c)
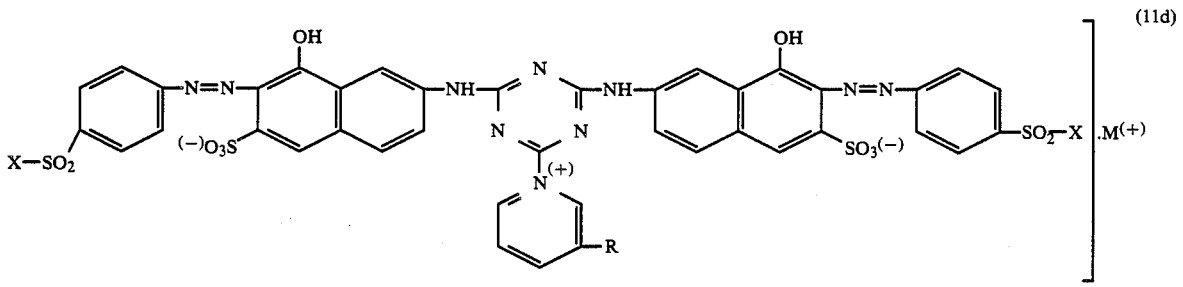
(11d)

-continued

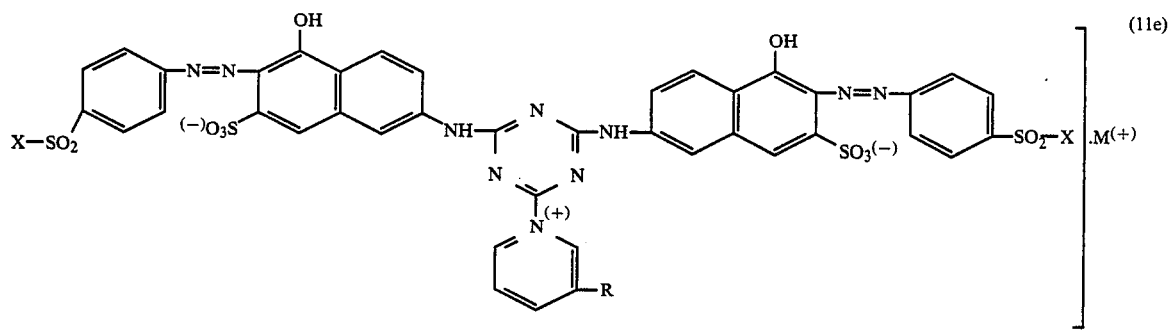
(11e)

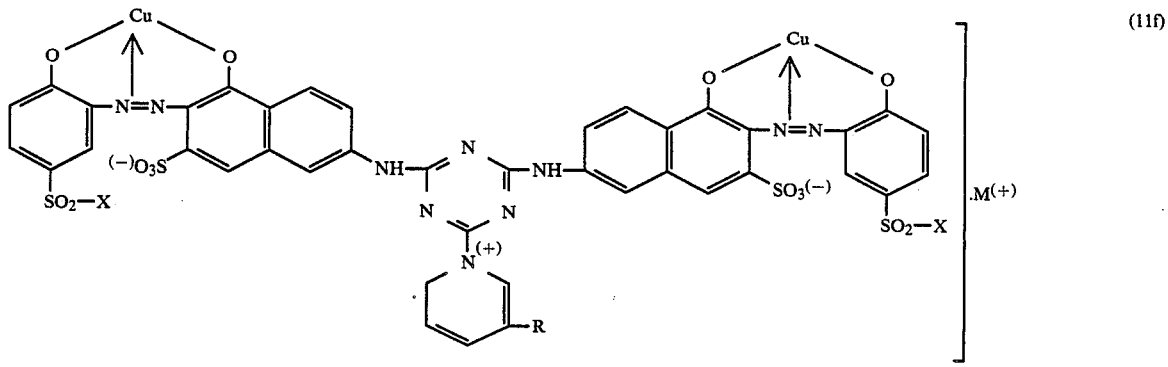
(11f)

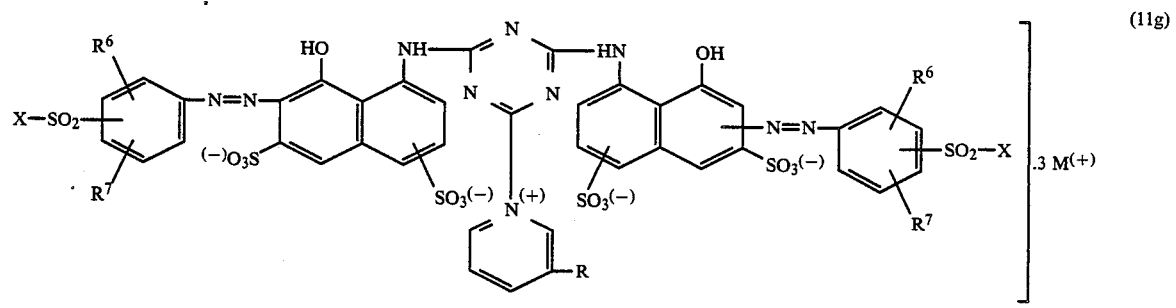
(11g)

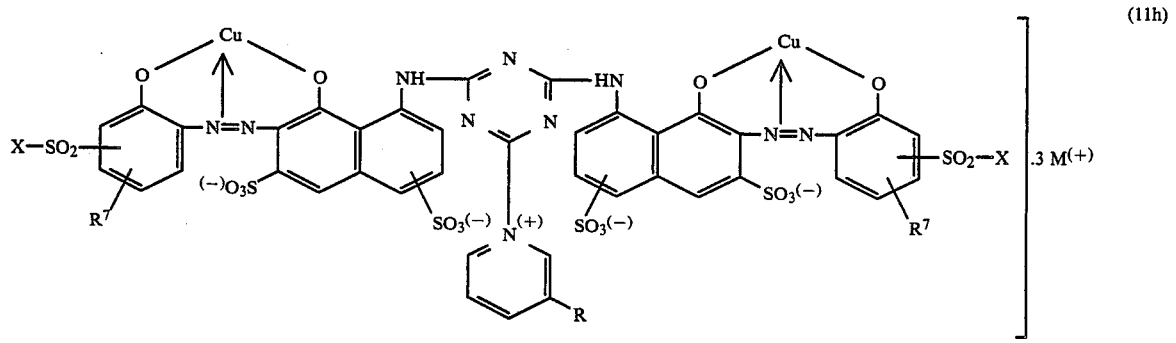
(11h)

in which M, R and R* have the abovementioned meanings, X stands for a vinyl group or preferably a β-sulfatoethyl group, $R^6$ denotes a hydrogen atom, a chlorine atom, a bromine atom or a methyl, methoxy, carboxy or sulfo group, and $R^7$ is a hydrogen atom or a methyl, methoxy, nitro or sulfo group.

The compounds according to the invention can be present in the form of their free acid and in the form of their salts, in particular the neutral salts. They are preferably in the form of their salts, in particular their alkali metal salts. They are preferably in the form of these salts when used for dyeing and printing hydroxy- and/or carboxamido-containing fiber materials.

The present invention further relates to processes for preparing the compounds according to the invention. The compounds according to the invention can be prepared by reacting a compound of the general formula (7)

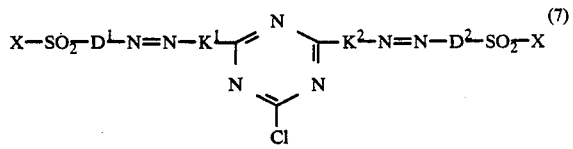

(7)

in which $D^1$, $D^2$, $K^1$, $K^2$ and X have the meanings indicated for the formula (1) or, if 1:1 copper complex starting compounds conforming to the general formula (7) are used, $D^1$ or $D^2$ or both have the meanings indicated for $D^*$ and in $K^1$ and $K^2$ the respective naphtholic hydroxy group is complex-bonded as an oxy group to the copper atom, with nicotinic acid or nicotinamide. This reaction is carried out analogously to the processing measures customary for this type of reaction, as mentioned for example in previously cited European patent application publication No. 0,167,219. Preferably, the reaction according to the invention takes place in an aqueous medium at a pH between 4 and 6, in particular between 4 and 5, preferably at a temperature between 60° and 100° C., preferably between 80° and 90° C.

The starting compounds of the general formula (7) are substantially known from previously cited British Pat. No. 2,007,698 B, or can be synthesized analogously to the statements made therein.

The 1:1 copper complex disazo compounds according to the invention can also be prepared in accordance with the invention by reacting a disazo compound which conforms to the general formula (1) and in which $D^1$ or $D^2$ or both stand for the formula radical $D^*$, where $D^*$ denotes a benzene ring which contains in the ortho-position relative to the azo group a hydroxy group and in addition to the group $-SO_2-X$ can additionally be substituted by a methyl, ethyl, methoxy, ethoxy, sulfo or carboxy group or a chlorine or bromine atom, or is a npahthalene ring which contains in the ortho-position relative to the azo group a hydroxy group, with a copper-donating agent, such as an inorganic copper(II) salt, such as copper sulfate or copper chloride, or a basic copper salt, such as copper oxycarbonate, in a preferably aqueous solution at a pH between 4 and 6 and at a temperature between 10° and 80° C. Methods for copper-complexing o,o'-dihydroxyazo compounds are described in large number in the literature and are known to those skilled in the art.

In the same way it is possible to start from such starting azo compounds as contain in $D^*$, in place of the hydroxy group in the ortho-position, a methoxy or ethoxy group by converting the alkoxy group in a conventional manner by a dealkylating coppering reaction, for instance by reaction with a copper-donating agent at a pH between 4 and 5 and at a temperature between 80° and 120° C. in an aqueous medium, into the complexing hydroxy group which forms a complex with the copper ion present.

Similarly, it is possible to start from such starting azo compounds as contain in $D^*$, in place of the hydroxy group in the ortho-position, a hydrogen atom by converting them by means of the oxidative coppering reaction, as the third customary method known per se for converting metal-free azo compounds into their copper complex compounds, into the copper complex compounds according to the invention, for example in an aqueous medium by means of hydrogen peroxide in the presence of copper(II) salts at a temperature of 20° to 60° C.

Such copper complex formation methods are described in the literature in large number.

The compounds of the general formula (1) prepared according to the invention are precipitated and isolated from the synthesis solutions by generally known methods, for example by precipitating from the reaction medium by means of electrolytes or by evaporating the reaction solution, for example by spray drying, it being possible for buffer substances to have been added beforehand to the synthesis solution in each case.

The compounds according to the invention have dye properties. As a consequence of the fiber-reactive groups which they possess, they can also find utility as fiber-reactive dyes. They can be employed in customary and known methods of applying and fixing fiber-reactive dyes on hydroxy-containing and/or carboxamido-containing materials, in particular fiber materials, for dyeing (including printing), for example wool, synthetic polyamide fibers, but in particular cellulose fiber materials, such as cotton. Methods of this type are described in large number in the trade literature as well as in the patent literature, for example in German Offenlegungsschrift No. 3,440,265.

The present invention thus also relates to the use of the compounds according to the invention for dyeing (including printing) hydroxy-containing and/or carboxamido-containing materials, in particular fiber materials, and to a process for dyeing (including printing) such materials by applying a compound according to the invention to the material from a preferably aqueous solution and fixing it on the material by means of heat and/or with the aid of an acid-binding agent—in the case of the dyeing hydroxy-containing materials preferably at a pH between 8 and 11 and at a temperature between 15° and 120° C., preferably between 20° and 80° C.

The compounds according to the invention have in addition the great advantage, as already mentioned at the beginning, of being capable of dyeing hydroxy-containing fiber materials, such as cellulose fiber materials, from an aqueous liquor, such as preferably in an aqueous dyebath in an exhaust method, even in a weakly acid pH range of 5 and greater than 5, such as at a pH between 5 and 7, i.e. surprisingly in the absence of alkaline substances, but optionally in the presence of a customary acid-binding buffer mixture for setting and maintaining the pH range and optionally in the presence of customary dyeing auxiliaries, at a temperature between 100° and 150° C., preferably at a temperature of 120° to 135° C., and of becoming fixed on these materials with fast results. Such buffers are for example aqueous solutions of phosphoric acid/sodium phosphate and acetic acid/sodium acetate.

Under these dyeing conditions (high-temperature neutral dyeing), which are known per se (see German Auslegeschrift No. 2,835,035) and which substantially correspond to the dyeing conditions of dyeing polyester fibers or other synthetic fibers, such as cellulose triacetate fibers, with disperse dyes, it is possible to dye cellulose blend fiber material, such as cellulose/cellulose triacetate fiber and cellulose/polyacrylonitrile fiber and in particular cellulose/polyester blend fiber materials, with a customary disperse dye at the same time and together with a fiber-reactive dye, namely an azo compound according to the invention, from a common aqueous dye liquor in a single-stage process with advantageous uniform and fast results and if desired tone-on-tone without the otherwise existing danger of damage to the disperse dye as well as to the synthetic fiber, such as polyester fiber.

The present invention thus also relates to a process for dyeing blend fiber materials made of cellulose and synthetic fibers, preferably cellulose/polyester fiber blends, with one (or more) disperse dye(s) and one or more dye(s) according to the invention through the action of these dyes on the fiber material from an aqueous dye liquor, preferably from an aqueous dyebath, at a temperature between 100° and 150° C., preferably at a temperature of 120° to 135° C., and at a pH between 4 and 8, if necessary between 5 and 7.5, preferably between 5 and 7.

This dyeing method according to the invention produces the desired high-quality dyeing by dyeing the synthetic fibers, such as polyester fibers, with the disperse dye and the cellulose fibers with the fiber-reactive azo compound according to the invention (the synthetic fiber, such as a cellulose triacetate and polyester fiber, is not stained by the azo compounds according to the invention). The quality of the dyeing on the synthetic fibers is contingent upon the disperse dye and corresponds to the state of the art. Surprisingly, cellulose fiber materials dyed with the azo compounds according to the invention under these conditions of a dyeing method for disperse dyes have, in addition to a bright shade, considerable fastness properties (these fastness properties are present whenever the azo compounds according to the invention are applied to the cellulose fiber materials in the alkaline range using the customary methods for applying and fixing fiber-reactive dyes). Worth mentioning among the good performance and manufacturing fastness properties are in particular the good light fastness properties not only of the dry but also of the moist cellulose dyeing impregnated with tap water or an alkaline perspiration solution, furthermore among the wet fastness properties in particular the good wash, water, seawater, crossdyeing and perspiration fastness properties and the good resistance to acid fading and likewise the good pleating, hot press, crock and sublimation fastness properties of dyeings obtainable on cellulose fiber materials with the azo compounds according to the invention not only by employing methods for fiber-reactive dyes but also by employing dyeing methods for disperse dyes.

The Examples which follow serve to illustrate the invention. The parts and percentages are by weight, unless otherwise stated. Parts by weight relate to parts by volume as the kilogram relates to the liter.

The compounds described in the Examples in terms of formulae are written in the form of the free acids; in general they are prepared and isolated in the form of their alkali metal salts and used for dyeing in the form of these salts. In the same way, the starting compounds and components mentioned in the Examples, in particular Table xamples, in the form of the free acids can be used as such or in the form of their salts, preferably alkali metal salts, such as sodium or potassium salts, in the synthesis. The absorption maxima ($\lambda_{max}$ values) mentioned in the Examples for the azo compounds according to the invention were determined in aqueous solution for the alkali metal salts.

EXAMPLE 1

(a) 28.1 parts of 3-($\beta$-sulfatoethylsulfonyl)-aniline are suspended in 140 parts of water and 60 parts of ice and dissolved at pH 6 by adding 6.3 parts of sodium carbonate. 20 parts of aqueous 5N sodium nitrite solution are added, and everything is added at 0° to 5° C. with stirring to a mixture of 150 parts of ice and 30 parts of 31% strength aqueous hydrochloric acid. This is followed by a further hour of stirring and removal of excess nitrous acid with a little sulfamic acid. In a separate batch, a solution of 9.3 parts of cyanuric chloride in 30 parts of acetone is poured with thorough stirring into 250 parts of water. A neutral solution of 23.9 parts of 2-amino-8-naphthol-6-sulfonic acid in 120 parts of water is added at 20° C., and the mixture is brought to pH 1.5 to 2.5 and subsequently stirred for an hour. The reaction temperature of the mixture is then raised to 40° to 50° C. while at the same time the mixture is brought to pH 5 by means of sodium carbonate, and the mixture subsequently stirred some more for a short time.

This solution of condensation product has added to it the diazonium salt solution prepared at the beginning; the coupling reaction is carried out at pH 5 to 6, and the resulting monochlorotriazine-disazo compound is salted out by means of sodium chloride and filtered off.

(b) The moist filter cake of the disazo compound obtained under (a) is dissolved in 500 parts of water; 9.2 parts of nicotinamide and 30 parts of sodium acetate are added; the reaction batch is brought to pH 4.3 by means of glacial acetic acid and stirred at the boil for 3 hours. The batch is then cooled down, and the compound formed is salted out with potassium chloride and isolated, and dried under reduced pressure at 60° to 80° C.

The result obtained is an electrolyte-containing orange-red powder of the alkali metal salt (predominantly potassium salt) of the compound of the formula

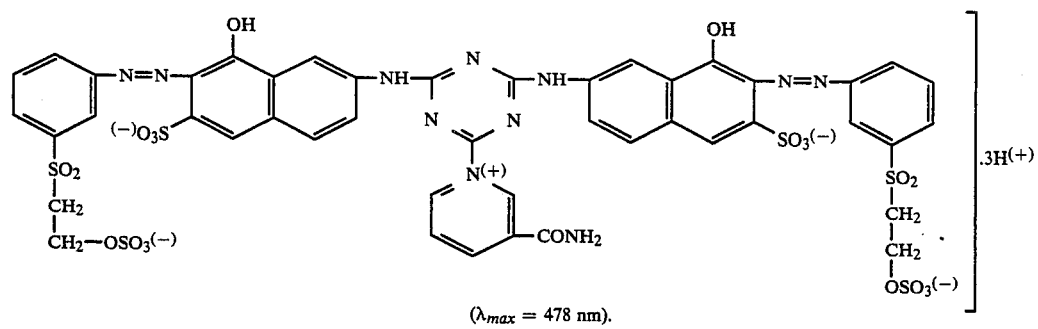

($\lambda_{max}$ = 478 nm).

This compound has very good fiber-reactive dye properties and dyes for example wool or cellulose fiber materials by the application and fixing techniques customary in the art for fiber-reactive dyes. On cotton, for example, deep orange-red dyeings and prints having good fastness properties are obtained (see Application Example 2).

The compound according to the invention can also be used advantageously for dyeing cellulose fiber materials under the conditions of dyeing polyester fibers with disperse dyes, i.e. from an aqueous solution at a pH between 5 and 8 and at a temperature between 110° and 130° C. (see Application Example 1).

EXAMPLE 2

The diazonium compound of 41.1 parts of 2-amino-6-(β-sulfatoethylsulfonyl)-naphthalene-1-sulfonic acid is coupled in a conventional manner with a secondary condensation product of cyanuric chloride and 2-amino-5-naphthol-7-sulfonic acid analogously to the directions of Example 1, and the monochlorotriazine-disazo compound thus obtained is reacted analogously to the directions of Example 1 with 9.2 parts of nicotinamide. The resulting disazo compound according to the invention is isolated by salting out.

The result obtained is an electrolyte-containing orange-red powder of the alkali metal salt of the compound of the formula This compound has very good fiber-reactive dye properties and dyes for example wool or cellulose fiber materials by the application and fixing techniques customary in the art for fiber-reactive dyes. On cellulose fiber materials, for example, deep orange dyeings and prints having good fastness properties are obtained analogously to Application Example 2.

The compound according to the invention can also be used advantageously for dyeing cellulose fiber materials under the conditions of dyeing polyester fibers with disperse dyes, i.e. from an aqueous solution at a pH between 5 and 8 and at a temperature between 110° and 130° C., analogously to Application Example 1.

EXAMPLE 3

To prepare a vinylsulfonyl-disazo compound according to the invention, an aqueous solution of the disazo compound of Example 2 according to the invention is brought to a pH between 11 and 12 with aqueous concentrated sodium hydroxide solution, and this alkaline solution is stirred at 25° C. for 1 to 5 minutes while this pH range is maintained. A pH value of 5 is then set by means of acetic acid, and the disazo compound according to the invention of the formula

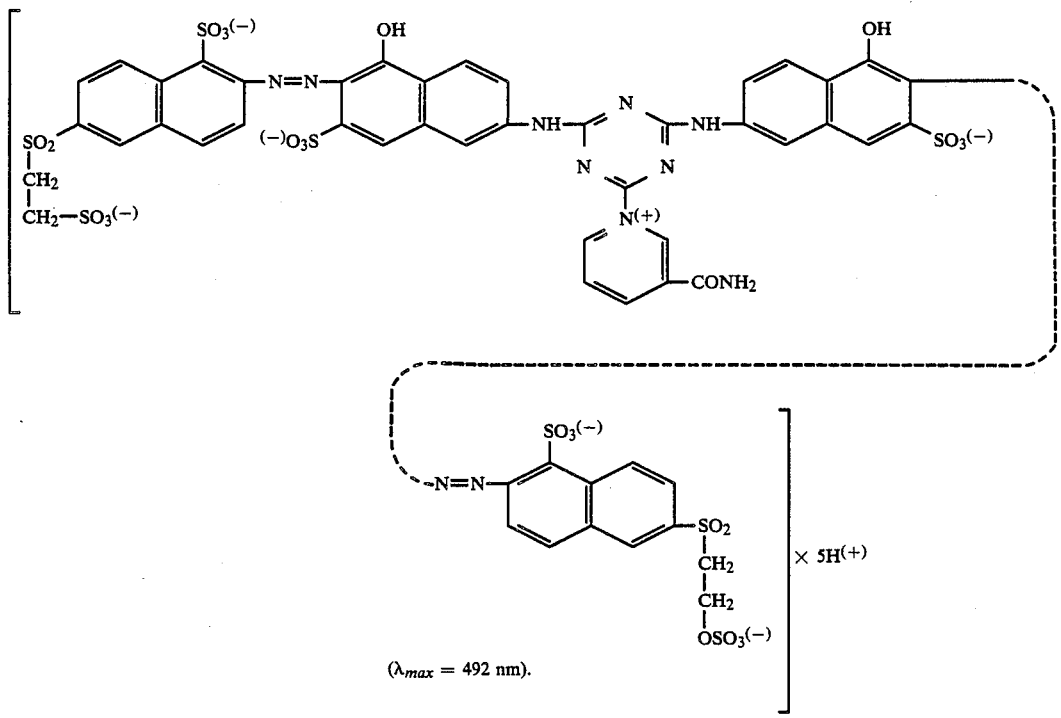

($\lambda_{max}$ = 492 nm).

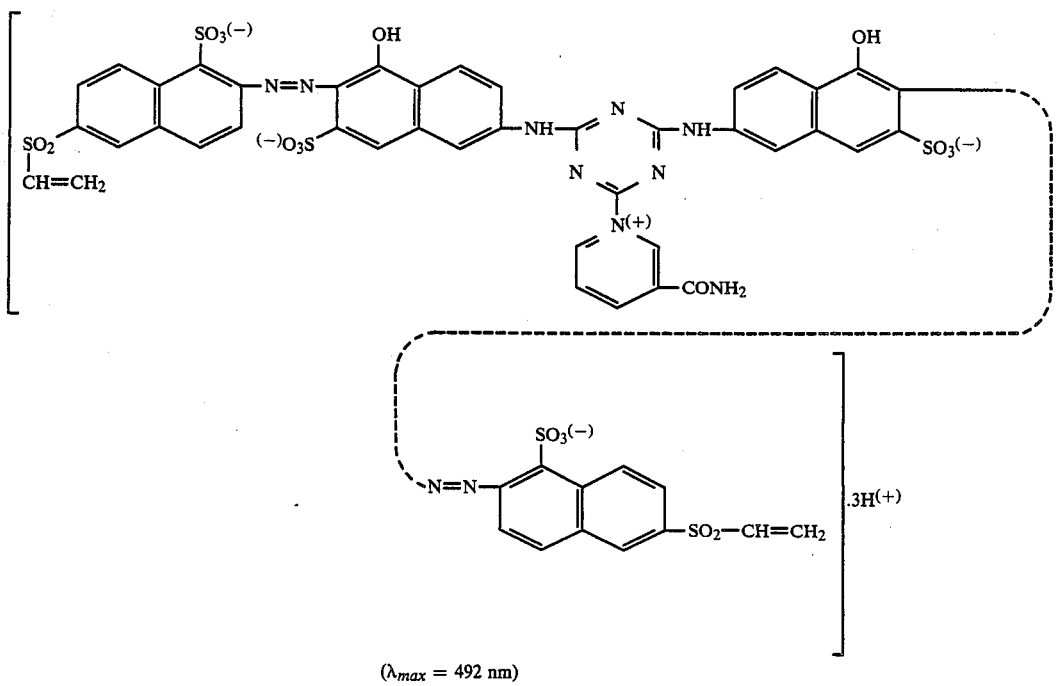

($\lambda_{max}$ = 492 nm)

is isolated in the form of an alkali metal salt. This compound according to the invention likewise has good dye properties and produces deep, fast dyeings of similar quality and good fastness properties by the dyeing methods of Application Example 1 or 2, although the addition of the buffer solution can be dispensed with.

EXAMPLE 4

(a) 36 parts of 2-bromo-4-($\beta$-sulfatoethylsulfonyl)-aniline are diazotized in a conventional manner and coupled in aqueous solution with 23.9 parts of 2-amino-5-naphthol-7-sulfonic acid at a pH between 5 and 6. The azo compound formed is salted out with potassium chloride, isolated and repeatedly washed with aqueous potassium chloride solution. The moist filter residue is then dissolved in 700 parts of water and stirred in the course of 30 minutes into a mixture of 9.3 parts of cyanuric chloride and 100 parts of ice. The reaction mixture is subsequently stirred for 30 minutes at a pH between 1.5 and 3, the reaction temperature thereof is then raised to 40° to 50° C., and the reaction is continued at a pH between 4 and 5 by appropriate addition of sodium bicarbonate until maintaining this pH range requires no further sodium bicarbonate to be added. The reaction solution subsequently has added to it 20% of sodium chloride, based on the volume of the reaction solution, and the precipitated electrolytecontaining monochlorodisazo compound is filtered off and dried.

(b) The monochlorotriazine-disazo compound of (a) is dissolved in 500 parts of water. The solution has added to it 9.2 parts of nicotinamide, followed by 5 parts of 85% strength orthophosphoric acid, the pH is brought to a value of 4.5 with sodium carbonate, and the reaction mixture is heated under reflux for 3 hours. After cooling down, the disazo compound according to the invention is isolated by salting out with potassium chloride or sodium chloride. Written in the form of the free acid, the disazo compound according to the invention has the formula

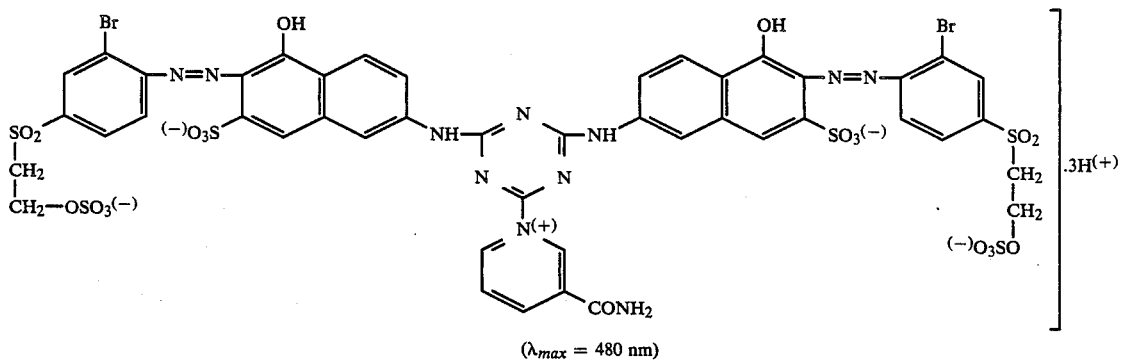

($\lambda_{max}$ = 480 nm)

and likewise exhibits very good fiber-reactive dye properties. It can be used for dyeing cellulose fiber materials not only in an alkaline dyebath in accordance with the customary application and fixing methods for fiber-reactive dyes but also in the weakly acid or neutral range, for example analogously to Application Example 1. The results obtained are deep orange-red dyeings having good fastness properties.

EXAMPLE 5

9.5 parts of cyanuric chloride and 31.9 parts of 1-amino-3,6-disulfo-8-naphthol are stirred in 200 parts of water for 2 hours, initially at a temperature of 0° to 10° C. and at a pH between 1.5 and 2.5, the reaction temperature is then raised to 40° to 50° C. and the pH to 4 to 5 by means of sodium carbonate, and the second condensation reaction is completed. The reaction mixture then has added to it 14.3 parts of nicotinic acid, followed by 7 parts of 85% strength phosphoric acid. The reaction mixture is brought to pH 5 to 5.5, and is stirred at 90° to 98° C. for a further 6 hours.

After cooling down the reaction mixture to 20° C., an aqueous diazonium salt suspension from 34.1 parts of 2,5-dimethoxy-4-(β-sulfatoethylsulfonyl)-aniline is added, and the coupling reaction is carried out at a pH between 4 and 6.

The azo compound according to the invention thus prepared is salted out with sodium chloride and isolated as the sodium salt. It has the formula

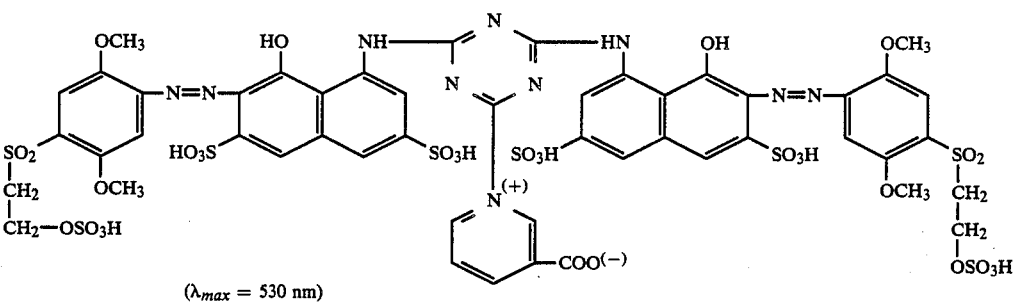

($\lambda_{max}$ = 530 nm)

and exhibits very good fiber-reactive dye properties. Under alkaline fixing conditions as employed in the customary dyeing and printing processes for fiber-reaction dyes, it produces in particular on cotton deep violet dyeings and prints having good fastness properties.

In a similar way, the so-called high-temperature neutral dyeing process (HTN process) produces at a pH between 6 and 7 and at a temperature between 120° and 140° C., for example analogously to Application Example 1 or 4, deep violet dyeings on cellulose fiber which have the same good fastness properties.

EXAMPLE 6

33.1 parts of the disazo compound of Example 5 according to the invention are dissolved together with 15 parts of crystalline copper(II) sulfate and 20 parts of crystalline sodium acetate in 500 parts of water, and the batch is brought to pH 4.5 to 5 and is then raised to the boil and the reaction is continued at the boil with stirring for a further 10 to 15 hours. The hot batch is then clarified, and the filtrate has added to it 20%, by volume of the solution, of potassium chloride and is stirred until cooled down to room temperature. The precipitated compound is filtered off and dried.

The copper complex disazo compound according to the invention and of the formula

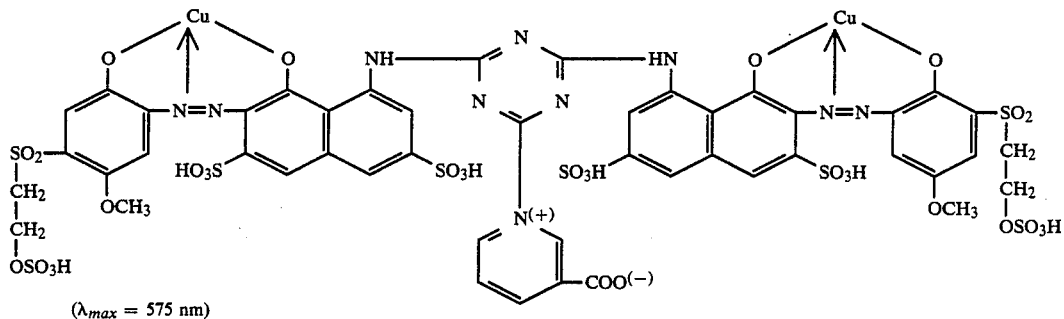

($\lambda_{max}$ = 575 nm)

is obtained in the form of its alkali metal salt (predominantly potassium salt). It has very good fiber-reactive dye properties and dyes in particular cellulose fiber materials, not only by the application and fixing techniques customary in the art for fiber-reactive dyes, i.e. using alkaline agents, for instance in a dyebath at a dyeing temperature of between 40° and 80° C. and at a pH between 9 and 11, but also under wealky acid to weakly alkaline dyeing conditions and temperatures at above 100° C. (for example in accordance with Application Example 5), in deep highly reddish blue shades having good fastness properties, in particular very good light and wet light fastness properties.

EXAMPLE 7

While stirring, 9.5 parts of cyanuric chloride are reacted with 12.6 parts of 2-methlyamino-5-naphthol-7-sulfonic acid in 300 parts of water at a temperature of about 10° C. and at a pH of 2 to 2.5 in the course of 1 to 2 hours to give first the monocondensation product, then a further 12.6 parts of 2-methylamino-5-naphthol-7-sulfonic acid are added, the pH is raised to a value of 5 by adding sodium carbonate, the reaction mixture is heated to 40° to 50° C. and subsequently stirred for a further 2 to 3 hours until a constant pH of 5 is obtained. 9.3 parts of nicotinamide are then added, the batch is brought to pH 5 by means of 10 parts of secondary sodium phosphate and a little hydrochloric acid, and the third condensation reaction is carried out by boiling for 3 to 5 hours.

After the reaction has ended, the batch has added to it the aqueous suspension of a conventionally prepared diazonium salt from 14.9 parts of 2-amino-4-(β-sulfatoethylsulfonyl)-phenol, and the coupling reaction is carried out at a pH between 5 and 7 and at a temperature between 10° and 20° C. by stirring for some hours. The disazo compound obtained is converted into the copper complex compound by adding 22 parts of basic copper-(II) carbonate to the batch and carrying out the copper complex formation reaction at 50° C. in the course of one hour. The reaction mixture is then clarified, and the copper complex disazo compound formed according to the invention is salted out of the filtrate with potassium chloride in an amount of 10%, based on the volume of the filtrate.

The compound obtained in the form of its alkali metal salt (predominantly potassium salt) has the formula (written in the form of the free acid)

EXAMPLE 8

First 9.5 parts of cyanuric chloride are reacted with 11.9 parts of 2-amino-8-naphthol-6-sulfonic acid in aqueous solution at about 10° C. and at pH 2, and after this monocondensation reaction has ended an aqueous solution of 15.9 parts of 1-amino-8-naphthol-4,6-disulfonic acid is added, the batch is heated to 40° to 60° C., and the second condensation reaction is carried out within this temperature range at a pH between 4 and 6 until starting compounds are no longer detectable, for example by titrating the amino groups or by thin layer chromatography or high pressure liquid chromatography (HPLC). 12.2 parts of nicotinic acid are then added, and the third condensation reaction is carried out at a pH between 4 and 5 and at a temperature of 90° C. for about 5 to 6 hours.

The aqueous suspension of the conventionally prepared diazonium salt of 28.1 parts of 4-β-sulfatoethyl-sulfonylaniline is then added, after the condensation batch has cooled down, and the coupling reaction is carried out at a temperature of between 10° and 20° C. and at a pH between 5 and 6. After a clarifying filtration the compound according to the invention is isolated in a conventional manner.

The compound of the formula

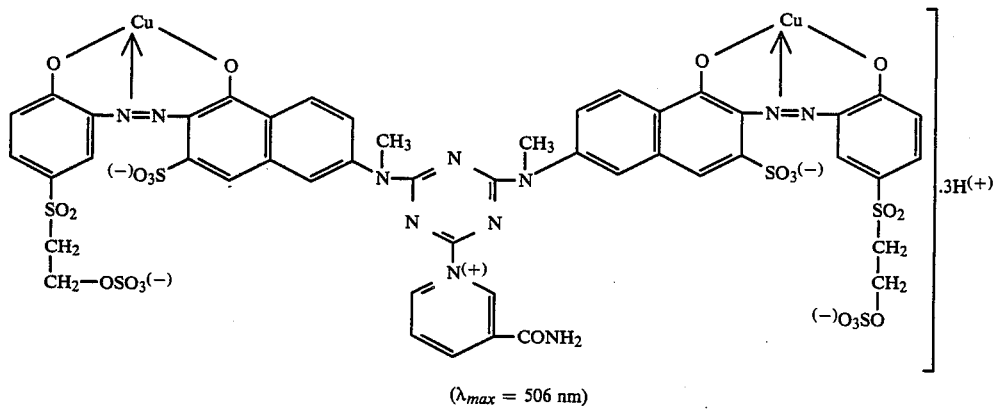

(λ_max = 506 nm)

and exhibits very good fiber-reactive dye properties and dyes cellulose fiber materials not only in the alkaline range by the customary application and fixing techniques employed for fiber-reactive dyes but also in the weakly acid to weakly alkaline range under the HTN conditions indicated in the description in deep, bright red shades having good fastness properties, in particular very good light and wet fastness properties. On dyeing cellulose fiber materials from an aqueous bath at temperatures between 120° and 130° C. in the weakly acid to weakly alkaline pH range (pH 4 to 8), dyeings of virtually the same quality and depth of shade are obtained over the entire pH range. The copper complex disazo compound according to the invention also shows a good color buildup.

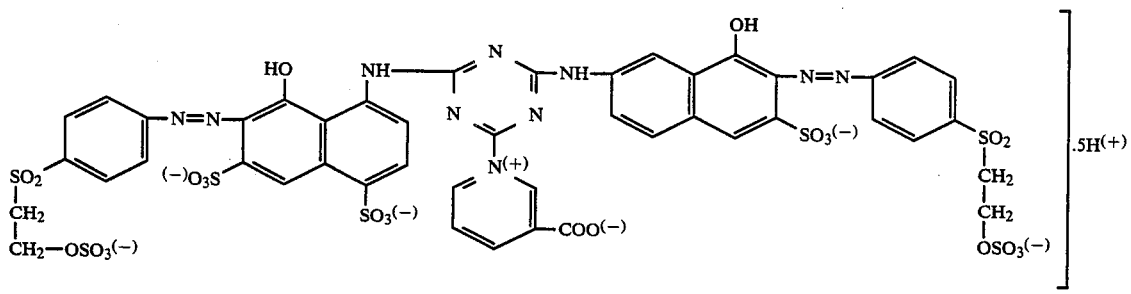

is obtained in the form of the alkali metal salt and exhibits very good fiber-reactive dye properties and produces on cellulose fiber materials not only by the high-temperature neutral dyeing process at a pH between 4 and 8 and at a temperature between 120° and 140° C. from an aqueous bath but also in the presence of alkaline agents in the dyeing and printing processes known for fiber-reactive dyes, at a pH between 9 and 11 and at a temperature between 60° and 80° C. from an aqueous dyebath, deep red dyeings and prints having good manufacturing and performance fastness properties.

EXAMPLES 9 to 48

The Table Examples which follow describe further disazo compounds according to the invention in terms of the formula members by referring to a general formula (A)

pounds according to the invention can be prepared in the manner of the invention, for example analogously to one of the above working examples. They have good fiber-reactive dye properties and produce deep, fast dyeings and prints on cellulose fiber materials in the hue indicated in the respective Table Example not only in the presence of alkaline agents at dyeing temperatures (fixing temperatures) of up to 100° C. but also in the

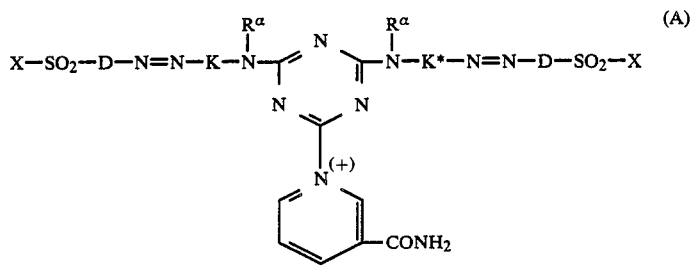

(A)

where the formula radical K represents the K* radical written in the Table in mirror-image form. The comweakly acid to neutral or weakly alkaline range at temperatures between 100° and 140° C.

| Example | Radical $R^a$ | Radical —K*— | Radical —D—SO$_2$—X | Hue on cotton | ($\lambda_{max}$) |
|---|---|---|---|---|---|
| 9 | Hydrogen | [naphthalene with OH, SO$_3$H, SO$_3$H] | 2-Bromo-4-($\beta$-sulfato-ethylsulfonyl)-phenyl | red | |
| 10 | Hydrogen | [naphthalene with OH, SO$_3$H] | 4-($\beta$-Sulfatoethyl-sulfonyl)-phenyl | orange | (478 nm) |
| 11 | Hydrogen | [naphthalene with OH, SO$_3$H] | 3-($\beta$-Sulfatoethyl-sulfonyl)-phenyl | orange | (476 nm) |
| 12 | Hydrogen | [naphthalene with OH, SO$_3$H] | 2-Methoxy-5-($\beta$-sulfato-ethylsulfonyl)-phenyl | scarlet | (494 nm) |
| 13 | Hydrogen | [naphthalene with OH, SO$_3$H] | 2-Methoxy-5-methyl-4-($\beta$-sulfatoethylsulfonyl)-phenyl | red | (502 nm) |
| 14 | Hydrogen | [naphthalene with OH, SO$_3$H] | 2,5-Dimethoxy-4-($\beta$-sulfatoethylsulfonyl)-phenyl | red | |

-continued

| Example | Radical $R^\alpha$ | Radical —K*— | Radical —D—SO$_2$—X | Hue on cotton | ($\lambda_{max}$) |
|---|---|---|---|---|---|
| 15 | Hydrogen | 1-hydroxy-3-sulfo-naphth-2,6-diyl (OH at 1, SO$_3$H at 3) | 4-[3'-($\beta$-Sulfatoethyl-sulfonyl)-phenyl-amido-carbonyl]-phenyl | orange | (482 nm) |
| 16 | Hydrogen | 1-hydroxy-3-sulfo-naphth-2,6-diyl | 2-Bromo-4-vinylsulfonyl-phenyl | orange | (482 nm) |
| 17 | Hydrogen | 1-hydroxy-3-sulfo-naphth-2,6-diyl | 6-Sulfo-8-($\beta$-sulfato-ethylsulfonyl)-naphth-2-yl | red | |
| 18 | Hydrogen | 1-hydroxy-3-sulfo-naphth-2,6-diyl | 6-($\beta$-Sulfatoethyl-sulfonyl)-naphth-2-yl | red | (498 nm) |
| 19 | Hydrogen | 1-hydroxy-3-sulfo-naphth-2,6-diyl | 4-[2'-Nitro-4'-($\beta$-sulfa-toethylsulfonyl)-phenyl-amino]-phenyl | violet | (510 nm) |
| 20 | Hydrogen | 1-hydroxy-3-sulfo-naphth-2,6-diyl | 2-Chloro-5-($\beta$-sulfato-ethylsulfonyl)-phenyl | orange | |
| 21 | Hydrogen | 1-hydroxy-3-sulfo-naphth-2,6-diyl | 2-Methoxy-4-($\beta$-sulfato-ethylsulfonyl9-phenyl | red | |
| 22 | Hydrogen | 1-hydroxy-3-sulfo-naphth-2,6-diyl | 3-Methoxy-4-($\beta$-sulfato-ethylsulfonyl)-phenyl | orange | |
| 23 | Hydrogen | 1-hydroxy-3-sulfo-naphth-2,6-diyl | 8-($\beta$-Sulfatoethylsul-fonyl)-naphth-2-yl | red | |
| 24 | Methyl | 1-hydroxy-3-sulfo-naphth-2,6-diyl | 4-($\beta$-Sulfatoethyl-sulfonyl)-phenyl | orange | (478 nm) |

-continued

| Example | Radical R$^a$ | Radical —K*— | Radical —D—SO$_2$—X | Hue on cotton | ($\lambda_{max}$) |
|---|---|---|---|---|---|
| 25 | Methyl | 1-hydroxy-3-sulfo-naphth-2-yl | 2-(Methoxy-5-($\beta$-sulfatoethylsulfonyl)-phenyl | scarlet | (494 nm) |
| 26 | Methyl | 1-hydroxy-3-sulfo-naphth-2-yl | 6-Sulfo-8-($\beta$-sulfatoethylsulfonyl)-naphth-2-yl | red | |
| 27 | Methyl | 1-hydroxy-3-sulfo-naphth-2-yl | 1-Sulfo-6-vinylsulfonyl-naphth-2-yl | scarlet | (492 nm) |
| 28 | Methyl | 1-hydroxy-3-sulfo-naphth-2-yl | 4-[2'-Nitro-4'-($\beta$-sulfatoethylsulfonyl)-phenylamino]-phenyl | violet | (510 nm) |
| 29 | Methyl | 1-hydroxy-3-sulfo-naphth-2-yl | 4-[3'-($\beta$-Sulfatoethylsulfonyl)-phenyl-amidocarbonyl]-phenyl | scarlet | (483 nm) |
| 30 | Hydrogen | 1-hydroxy-3-sulfo-naphth-2-yl | 2-Chloro-5-($\beta$-sulfatoethylsulfonyl)-phenyl | orange | |
| 31 | Hydrogen | 1-hydroxy-3-sulfo-naphth-2-yl | 4-($\beta$-Sulfatoethylsulfonyl)-phenyl | orange | |
| 32 | Hydrogen | 1-hydroxy-3-sulfo-naphth-2-yl | 2-Methoxy-5-($\beta$-sulfatoethylsulfonyl)-phenyl | red | |
| 33 | Hydrogen | 1-hydroxy-3-sulfo-naphth-2-yl | 2,5-Dimethoxy-4-($\beta$-sulfatoethylsulfonyl)-phenyl | bluish red | |
| 34 | Methyl | 1-hydroxy-3-sulfo-naphth-2-yl | 4-($\beta$-Sulfatoethylsulfonyl)-phenyl | orange | |

-continued

| Example | Radical $R^a$ | Radical —K*— | Radical —D—SO$_2$—X | Hue on cotton | ($\lambda_{max}$) |
|---|---|---|---|---|---|
| 35 | Methyl | 1-hydroxy-3-sulfo-naphthyl (OH at 1, SO$_3$H at 3) | 3-($\beta$-Sulfatoethylsulfonyl)-phenyl | orange | |
| 36 | Hydrogen | 1-hydroxy-3-sulfo-naphthyl | 1-Sulfo-6-vinylsulfonyl-naphthyl-2-yl | red | |
| 37 | Methyl | 1-hydroxy-3-sulfo-naphthyl | 4-[2'-Nitro-4'-($\beta$-sulfatoethylsulfonyl)-phenyl-amino]-phenyl | violet | |
| 38 | Hydrogen | 1-hydroxy-3-sulfo-naphthyl | 2-Bromo-4-($\beta$-sulfatoethylsulfonyl)-phenyl | orange | |
| 39 | Hydrogen | 1-hydroxy-3-sulfo-naphthyl | 4-[3'-($\beta$-Sulfatoethylsulfonyl)-phenyl-amidocarbonyl]-phenyl | red | |
| 40 | Hydrogen | 1-hydroxy-3,6-disulfo-naphthyl | 4-[3'-($\beta$-Sulfatoethylsulfonyl)-phenyl-amidocarbonyl]-phenyl | bluish red | (516 nm) |
| 41 | Hydrogen | 1-hydroxy-3,6-disulfo-naphthyl | 4-Vinylsulfonyl-phenyl | bluish red | (510 nm) |
| 42 | Hydrogen | 1-hydroxy-3,6-disulfo-naphthyl | 2-Bromo-4-vinylsulfonyl-phenyl | bluish red | (512 nm) |
| 43 | Hydrogen | 1-hydroxy-3,6-disulfo-naphthyl | 4-[2'-Nitro-4'-($\beta$-sulfatoethylsulfonyl)-phenyl-amino]-phenyl | violet | |
| 44 | Hydrogen | 1-hydroxy-3,6-disulfo-naphthyl | 2-Methoxy-5-($\beta$-sulfatoethylsulfonyl)-phenyl | bluish red | |

-continued

| Example | Radical $R^\alpha$ | Radical —K*— | Radical —D—$SO_2$—X | Hue on cotton | ($\lambda_{max}$) |
|---|---|---|---|---|---|
| 45 | Hydrogen | ![naphthol with OH, HO3S, SO3H] | 6-($\beta$-Sulfatoethylsulfonyl)-naphth-2-yl | violet | (526 nm) |
| 46 | Hydrogen | ![naphthol with OH, SO3H, SO3H] | 3-($\beta$-Sulfatoethyl-sulfonyl)-phenyl | red | |
| 47 | Hydrogen | ![naphthol with OH, SO3, SO3H] | 4-Vinylsulfonyl-phenyl | red | |
| 48 | Hydrogen | ![naphthol with OH, SO3H, SO3H] | 2-Bromo-4-vinylsulfonyl-phenyl | red | |

EXAMPLES 49 to 74

The Table Examples which follow describe further disazo compounds according to the invention in terms of the formula members by referring to a general formula (B)

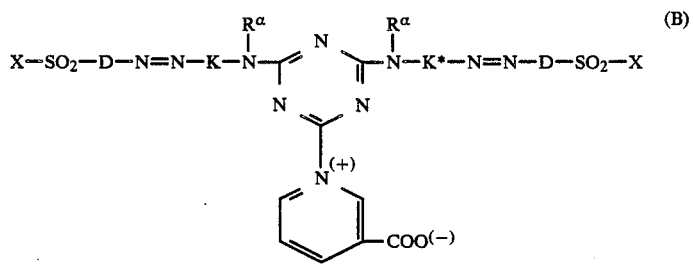

(B)

where the formula radical K represents the K* radical written in the Table in mirror-image form. The compounds according to the invention can be prepared in the manner of the invention, for example analogously to one of the above working examples. They have good fiber-reactive dye properties and produce deep, fast dyeings and prints on cellulose fiber materials in the hue indicated in the respective Table Example not only in the presence of alkaline agents at dyeing temperatures (fixing temperatures) of up to 100° C. but also in the weakly acid to neutral or weakly alkaline range at temperatures between 100° and 140° C.

| Example | Radical $R^\alpha$ | Radical—K*— | Radical—D—$SO_2$—X | Hue on cotton ($\lambda_{max}$) |
|---|---|---|---|---|
| 49 | Hydrogen | ![naphthol with OH, SO3H] | 2-Bromo-4-($\beta$-sulfatoethylsulfonyl)-phenyl | orange (482 nm) |
| 50 | Methyl | ![naphthol with OH, SO3H] | 2-Bromo-4-($\beta$-sulfatoethylsulfonyl)-phenyl | orange (480 nm) |

-continued

| Example | Radical $R^\alpha$ | Radical —K*— | Radical —D—SO$_2$—X | Hue on cotton ($\lambda_{max}$) |
|---|---|---|---|---|
| 51 | Methyl | 1-hydroxy-3-sulfo-naphth-2-yl (OH, SO$_3$H) | 2-Methoxy-5-($\beta$-sulfatoethylsulfonyl)-phenyl | scarlet (494 nm) |
| 52 | Hydrogen | 1-hydroxy-3-sulfo-naphth-2-yl | 1-Sulfo-6-($\beta$-sulfatoethylsulfonyl)-naphth-2-yl | scarlet (490 nm) |
| 53 | Methyl | 1-hydroxy-3-sulfo-naphth-2-yl | 1-Sulfo-6-($\beta$-sulfatoethylsulfonyl)-naphth-2-yl | scarlet |
| 54 | Hydrogen | 1-hydroxy-3-sulfo-naphth-2-yl | 4-[2'-Nitro-4'-($\beta$-sulfatoethylsulfonyl)-phenyl-amino]-phenyl | violet (510 nm) |
| 55 | Hydrogen | 1-hydroxy-3-sulfo-naphth-2-yl | 4-[3'-($\beta$-Sulfatoethylsulfonyl)-phenyl-amido-carbonyl]-phenyl | orange (482 nm) |
| 56 | Hydrogen | 1-hydroxy-3-sulfo-naphth-2-yl | 2-Methoxy-5-methyl-4-($\beta$-sulfatoethylsulfonyl)-phenyl | red (500 nm) |
| 57 | Methyl | 1-hydroxy-3-sulfo-naphth-2-yl | 2-Methoxy-5-methyl-4-($\beta$-sulfatoethylsulfonyl)-phenyl | red (501 nm) |
| 58 | Hydrogen | 1-hydroxy-3-sulfo-naphth-2-yl | 4-($\beta$-Sulfatoethylsulfonyl)-phenyl | orange (478 nm) |
| 59 | Hydrogen | 1-hydroxy-3-sulfo-naphth-2-yl | 2-Bromo-4-($\beta$-sulfatoethylsulfonyl)-phenyl | orange |
| 60 | Hydrogen | 1-hydroxy-3-sulfo-naphth-2-yl | 3-($\beta$-Sulfatoethylsulfonyl)-phenyl | orange (476 nm) |

-continued

| Example | Radical R$^\alpha$ | Radical —K*— | Radical —D—SO$_2$—X | Hue on cotton ($\lambda_{max}$) |
|---|---|---|---|---|
| 61 | Methyl | naphthalene with OH, SO$_3$H | 4-($\beta$-Sulfatoethylsulfonyl)-phenyl | orange |
| 62 | Methyl | naphthalene with OH, SO$_3$H | 2-Bromo-4-($\beta$-sulfatoethylsulfonyl)-phenyl | orange |
| 63 | Methyl | naphthalene with OH, SO$_3$H | 3-Vinylsulfonyl-phenyl | orange |
| 64 | Hydrogen | naphthalene with OH, HO$_3$S, SO$_3$H | 3-Vinylsulfonyl-phenyl | red |
| 65 | Hydrogen | naphthalene with OH, HO$_3$S, SO$_3$H | 2-Methoxy-5-vinylsulfonyl-phenyl | bluish red |
| 66 | Hydrogen | naphthalene with OH, HO$_3$S, SO$_3$H | 8-($\beta$-Sulfatoethylsulfonyl)-naphth-2-yl | bluish red |
| 67 | Hydrogen | naphthalene with OH, HO$_3$S, SO$_3$H | 1-Sulfo-6-($\beta$-sulfatoethylsulfonyl)-naphth-2-yl | bluish red |
| 68 | Hydrogen | naphthalene with OH, HO$_3$S, SO$_3$H | 4-[2'-Nitro-4'-($\beta$-sulfatoethylsulfonyl)-phenyl-amino]-phenyl | violet (536 nm) |
| 69 | Hydrogen | naphthalene with OH, HO$_3$S, SO$_3$H | 2-Bromo-4-($\beta$-sulfatoethylsulfonyl)-phenyl | violet (512 nm) |
| 70 | Hydrogen | naphthalene with OH, HO$_3$S, SO$_3$H | 4-[3'-($\beta$-Sulfatoethylsulfonyl)-phenyl-amidocarbonyl]-phenyl | bluish red (516 nm) |
| 71 | Hydrogen | naphthalene with OH, HO$_3$S, SO$_3$H | 2-Methoxy-5-($\beta$-sulfatoethylsulfonyl)-phenyl | bluish red |

-continued

| Example | Radical $R^\alpha$ | Radical —K*— | Radical —D—$SO_2$—X | Hue on cotton ($\lambda_{max}$) |
|---|---|---|---|---|
| 72 | Hydrogen | 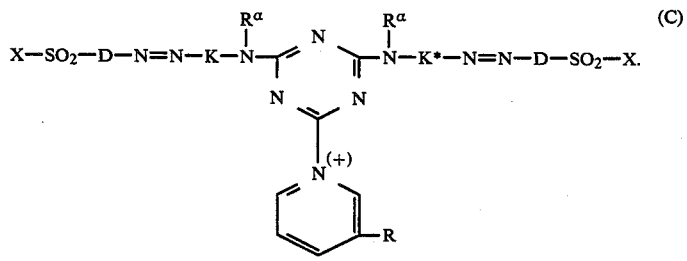 | 2-Bromo-4-($\beta$-sulfatoethylsulfonyl)-phenyl | bluish red |
| 73 | Hydrogen | (same naphthyl as above) | 4-[2'-Nitro-4'-($\beta$-sulfatoethylsulfonyl)-phenyl-amino]-phenyl | violet |
| 74 | Hydrogen | (same naphthyl as above) | 4-($\beta$-Sulfatoethylsulfonyl)-phenyl | bluish red |

EXAMPLES 75 to 80

The Table Examples which follow describe further disazo compounds according to the invention in terms of the formula members by referring to a general formula (C)

$$X-SO_2-D-N=N-K-N(R^\alpha)-\underset{\underset{\underset{N(+)-R}{|}}{N}}{C}=N-C=N-K^*-N=N-D-SO_2-X \quad (C)$$

(with a pyridinium ring bearing R attached to the central triazine N(+))

The compounds according to the invention can be prepared in the manner of the invention, for example analogously to one of the above Working Examples. They have good fiber-reactive dye properties and produce deep, fast dyeings and prints on cellulose fiber materials in the hue indicated in the respective Table Example not only in the presence of alkaline agents at dyeing temperatures (fixing temperatures) of up to 100° C. but also in the weakly acid to neutral or weakly alkaline range at temperatures between 100° and 140° C.

| Example | R | $R^\alpha$ | —K— | —K*— | —D—$SO_2$—X | Hue on cotton |
|---|---|---|---|---|---|---|
| 75 | —$CONH_2$ | Hydrogen | HO-naphthyl-$SO_3H$ | HO-naphthyl(SO_3H)_2 | 4-($\beta$-Sulfato-ethylsulfonyl)-phenyl | red |
| 76 | $CONH_2$ | Methyl | " | OH-naphthyl-$SO_3H$ | 4-($\beta$-Sulfato-ethylsulfonyl)-phenyl | orange |
| 77 | —$CONH_2$ | Hydrogen | " | " | 4-($\beta$-Sulfato-ethylsulfonyl)-phenyl | orange |

-continued

| Example | R | $R^\alpha$ | —K— | —K*— | —D—SO$_2$—X | Hue on cotton |
|---|---|---|---|---|---|---|
| 78 | —CONH$_2$ | " | naphthalene with HO, HO$_3$S substituents | naphthalene with OH, HO$_3$S, SO$_3$H substituents | 4-Vinylsulfonyl-phenyl | red |
| 79 | —CONH$_2$ | " | naphthalene with HO, HO$_3$S, SO$_3$H substituents | naphthalene with OH, HO$_3$S, SO$_3$H substituents | 4-Vinylsulfonyl-phenyl | bluish red |
| 80 | —COO$^{(-)}$ | " | " | " | 4-Vinylsulfonyl-phenyl | bluish red |

EXAMPLES 81 TO 108

The Table Examples which follow describe further copper complex disazo compounds according to the invention in terms of the formula members by referring to a general formula (D)

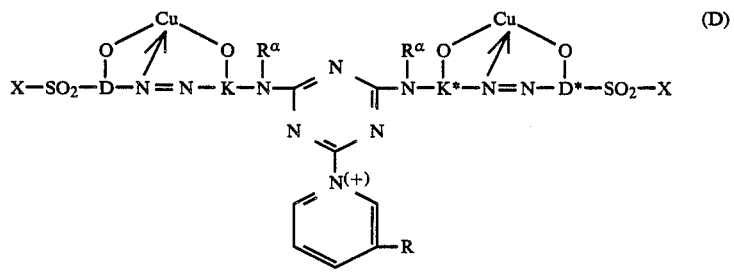

(D)

where the formula radical K represents the K* radical written in the Table in mirror-image form and the formula radical D represents the D* radical written in the Table in mirror-image form. The compounds according to the invention can be prepared in the manner of the invention, for example analogously to one of the above Working Examples. They have good fiber-reactive dye properties and produce deep, fast dyeings and prints on cellulose fiber materials in the hue indicated in the respective Table Example not only in the presence of alkaline agents at dyeing temperatures (fixing temperatures) of up to 100° C. but also in the weakly acid to neutral or weakly alkaline range at temperatures between 100° and 140° C.

| Example | R | $R^\alpha$ | Radical —K*(—O—) | Radical (—O—)D*—SO$_2$—X | Radical X | Hue on cotton ($\lambda_{max}$) |
|---|---|---|---|---|---|---|
| 81 | —CONH$_2$ | H | naphthalene with O, SO$_3$H substituents | phenyl with O, SO$_2$—X substituents | β-Sulfatoethyl | violet |
| 82 | —CONH$_2$ | H | " | phenyl with O, SO$_2$—X substituents | " | violet (506 nm) |

-continued

| Example | R | R^α | Radical —K*(—O—) | Radical (—O—)D*—SO₂—X | Radical X | Hue on cotton (λ_max) |
|---|---|---|---|---|---|---|
| 83 | —CONH₂ | H | " | 4-methoxy-2-methylphenyl-SO₂—X | " | violet |
| 84 | —CONH₂ | H | " | 3-methoxy-4-methylphenyl-SO₂—X | " | violet |
| 85 | —CONH₂ | H | " | methoxy-methylnaphthyl-SO₂—X | " | violet |
| 86 | —CONH₂ | CH₃ | " | 4-methoxy-3-methylphenyl-SO₂—X | Vinyl | violet (507 nm) |
| 87 | —CONH₂ | CH₃ | " | " | β-Sulfatoethyl | violet (508 nm) |
| 88 | —CONH₂ | CH₃ | " | 4-methoxy-2-methylphenyl-SO₂—X | Vinyl | violet |
| 89 | —CONH₂ | CH₃ | " | methoxy-methylnaphthyl-SO₂—X | β-Sulfatoethyl | violet |
| 90 | —CONH₂ | H | 4-methoxy-methylnaphthyl-3-SO₃H | 4-methoxy-2-methylphenyl-SO₂—X | " | violet |

-continued

| Example | R | $R^a$ | Radical —K*(—O—) | Radical (—O—)D*—SO$_2$—X | Radical X | Hue on cotton ($\lambda_{max}$) |
|---|---|---|---|---|---|---|
| 91 | —CONH$_2$ | H | " | methoxy-methyl-phenyl-SO$_2$—X | " | violet |
| 92 | —CONH$_2$ | H | methoxy-methyl-naphthalene with HO$_3$S and SO$_3$H | " | " | blue |
| 93 | —CONH$_2$ | H | " | methoxy-methyl-naphthalene-SO$_2$—X | " | blue (536 nm) |
| 94 | —CONH$_2$ | H | " | methoxy-methyl-phenyl-SO$_2$—X | " | violet |
| 95 | —CONH$_2$ | H | " | dimethoxy-methyl-phenyl-SO$_2$—X (OCH$_3$) | " | blue |
| 96 | —CONH$_2$ | H | methoxy-methyl-naphthalene with SO$_3$H groups | methoxy-methyl-phenyl-SO$_2$—X | " | violet |
| 97 | —CONH$_2$ | H | " | methoxy-methyl-naphthalene-SO$_2$—X | " | violet |
| 98 | —COO$^{(-)}$ | H | methoxy-naphthalene-SO$_3$H | methoxy-methyl-phenyl-SO$_2$—X | " | violet |

| Example | R | R$^\alpha$ | Radical —K*(—O—) | Radical (—O—)D*—SO$_2$—X | Radical X | Hue on cotton ($\lambda_{max}$) |
|---|---|---|---|---|---|---|
| 99 | —COO$^{(-)}$ | H | " | " | Vinyl | violet |
| 100 | —COO$^{(-)}$ | CH$_3$ | " | " | β-Sulfatoethyl | violet |
| 101 | —COO$^{(-)}$ | H | " | (2,5-dimethoxyphenyl-SO$_2$—X) | " | violet |
| 102 | —COO$^{(-)}$ | H | (methoxy-naphthalene-disulfo) | " | Vinyl | violet |
| 103 | —COO$^{(-)}$ | H | " | (methoxyphenyl-SO$_2$—X) | β-Sulfatoethyl | blue |
| 104 | —COO$^{(-)}$ | H | " | (methoxy-naphthyl-SO$_2$—X) | " | blue |
| 105 | —COO$^{(-)}$ | H | " | (methoxy-naphthyl-SO$_2$—X) | " | blue |
| 106 | —COO$^{(-)}$ | H | (methoxy-naphthalene-disulfo) | (methoxyphenyl-SO$_2$—X) | Vinyl | violet |

EXAMPLE 107

The monochlorotriazinylamino-disazo compound is prepared in a conventional manner as a dicondensation product from the starting components cyanuric chloride, a monoazo compound with 2-hydroxy-4-(β-sulfatoethylsulfonyl)-aniline as diazo component and 1-amino-3,6-disulfo-8-naphthol as coupling component and a second monoazo compound with 2-hydroxy-4-(β-sulfatoethylsulfonyl)-aniline as diazo component and 1-amino-4,6-disulfo-8-naphthol as coupling component and is converted in aqueous solution at a temperature of 50° C. and at a pH of 5 by means of copper sulfate into the corresponding monochlorotriazinylamino/copper complex/disazo compound. This solution of the copper complex compound then has added to it an equivalent amount of nicotinic acid, and the third condensation reaction is carried out at a pH of about 4.5 and in the presence of a sodium acetate/glacial acetic acid buffer analogously to above Example 1b.

Salting out and isolating gives an electrolyte-containing dark powder of the alkali metal salt of the compound of the formula

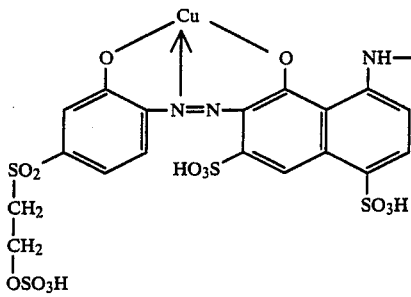 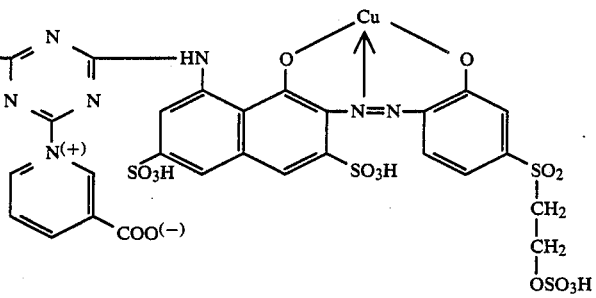

This copper complex disazo compound has very good fiber-reactive dye properties and dyes in particular cellulose fiber materials in deep, fast violet shades not only by the application and fixing techniques customary in the art for fiber-reactive dyes, i.e. under alkaline conditions, but also under the application conditions of the high-temperature neutral dyeing process, for instance at a temperature of between 120° and 130° C. and at a pH of 6 in aqueous solution.

APPLICATION EXAMPLE 1

5 parts of a cotton fabric are placed in a dyebath composed of 0.1 part of the disazo compound according to the invention of Example 1 (in the form of a neutral salt), 5 parts of anhydrous sodium sulfate, 80 parts of water and 20 parts of an aqueous buffer solution prepared from 20 parts of water and 2 parts of 85% strength phosphoric acid and brought to pH 6 with sodium hydroxide solution. The fabric is treated in the bath at a temperature of 130° C. for 60 to 90 minutes. The dyeing obtained is then aftertreated by rinsing with warm and with hot water, by washing in an aqueous bath composed of 150 parts of water and 0.15 part of a nonionic agent at the boil for 15 minutes and by renewed rinsing with warm water, and dried.

The result obtained is a deep orange-red dyeing which has a good light fastness and good wet fastness properties such as a good water, 60° C. wash, perspiration and chlorinated water fastness, and also a good crock fastness. In addition, the compound according to the invention exhibits a good color buildup in this dyeing process.

If the dyeing process is carried out not at pH 6 but at pH 5, pH 7 or pH 8, the results obtained are equally good orange-red dyeings of virtually the same depth of shade as that of the dyeing prepared at pH 6.

APPLICATION EXAMPLE 2

If the disazo compound according to the invention of Example 1 is used for dyeing cellulose fiber material, such as cotton fabric, in a dyeing process customary for fiber-reactive dyes, for example in an exhaust process at a temperature of 60° C. or 80° C. in the presence of an alkaline agent, such as sodium carbonate and sodium hydroxide solution, and in the presence of an electrolyte salt, such as sodium sulfate, this likewise produces very deep orange-red dyeings having good fastness properties, in particular a good light fastness and crock fastness and good water, wash, perspiration and chlorinated water fastness properties.

APPLICATION EXAMPLE 3

A dyebath is prepared from 80 parts of water, 0.05 part of the disazo compound according to the invention of Example 2, 5 parts of anhydrous sodium sulfate and 20 parts of an aqueous buffer solution capable of maintaining a pH of 6, and thereafter 0.1 part of a predispersed disperse dye of Colour Index No. 11227 (C.I. Disperse Orange 25) and 0.1 part of a commercially available dispersant customary for the application of disperse dyes are added. This dye liquor is used to dye 5 parts of a polyester/cotton blend fabric (50:50) at a temperature of 130° C. and at a pH of 6 in the course of 90 minutes. Thereafter the dyed fabric is removed from the dyeing liquor and aftertreated and finished (for example as described in Application Example 1). The result obtained is a fabric dyed in an even and bright orange with both the fiber portions having been fully penetrated. The dyeing has the good fastness properties of the cotton dyeings of Example 2 and of the polyester dyeings of the known disperse dye.

APPLICATION EXAMPLE 4

A dyebath is prepared from 59 parts of water, 1 part of the disazo compound according to the invention Example 4, 50 parts of anhydrous sodium sulfate and 5 parts of phosphoric acid, and is brought to pH 4.5 with sodium carbonate. 50 parts of a cotton fabric are then introduced, and the dyeing is carried out in a sealed apparatus with constant agitation at a dyeing temperature of 140° C. in the course of 30 minutes. The dyed fabric is then removed and finished by rinsing with hot and cold water, by treatment at the boil for 50 minutes in an aqueous bath containing a small amount of a nonionic detergent, by renewed rinsing with water and drying. The result obtained is a cotton fabric dyed a deep orange-red having very good fastness properties.

APPLICATION EXAMPLE 5

A dyeing liquor is prepared from 950 parts of water, 2 parts of a copper complex disazo compound according to the invention of Example 6 and 50 parts of sodium chloride. This dye liquor having a pH of about 6 is entered with 50 parts of a cotton fabric, which is dyed by treatment at a dyeing temperature of 120° C. for 2 hours. The fabric is finished in a conventional manner, for example analogously to the directions of Application Example 1. The dyeing exhibits a deep reddish blue hue having very good light and wet light fastness properties.

We claim:

1. A process for dyeing a hydroxy-containing fiber-material, which comprises applying a disazo compound conforming to the formula

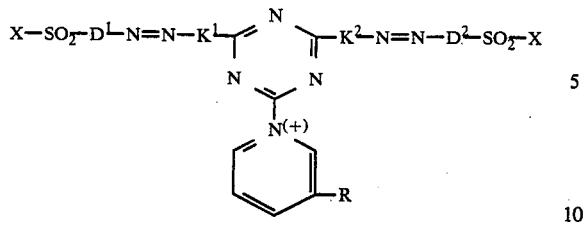

in which
- D¹ is a benzene ring which is unsubstituted or substituted by 1 or 2 substituents which are selected from the set consisting of 2 methyl, 2 ethyl, 2 methoxy, 2 ethoxy, 2 sulfo, 1 carboxy, 1 chlorine and 1 bromine, one of these substituents being bonded to the benzene nucleus in the ortho-position relative to the azo group, or
- D¹ is a naphthalene ring which is unsubstituted or substituted by sulfo in the ortho-position relative to the azo group, or
- D¹ is a group of the formula

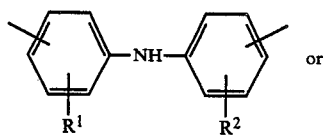

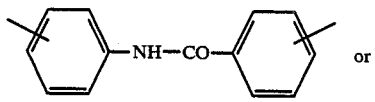

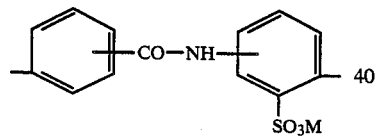

in which
R¹ is hydrogen, nitro, sulfo, methyl, ethyl, methoxy or ethoxy and
R² has one of the meanings of R¹ and is identical to R¹ or different from R¹,
D² is a benzene ring which is unsubstituted or substituted by 1 or 2 substituents which are selected from the set consisting of 2 methyl, 2 ethyl, 2 methoxy, 2 ethoxy, 2 sulfo, 1 carboxy, 1 chlorine and 1 bromine, one of these substituents being bonded to the benzene nucleus in the ortho-position relative to the azo group, or
D² is a naphthalene ring which is unsubstituted or substituted by sulfo in the ortho-position relative to the azo group, or
D² is a group of the formula

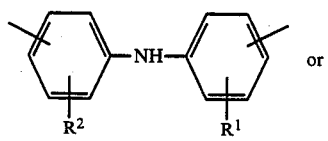

-continued

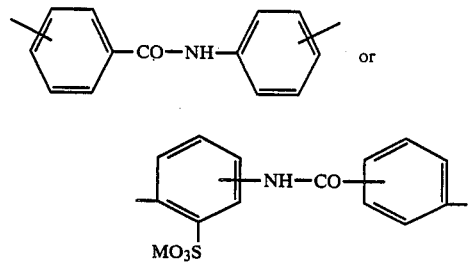

in which
R¹ is hydrogen, nitro, sulfo, methyl, ethyl, methoxy or ethoxy and
R² has one of the meanings of R¹ and is identical to R¹ or different from R¹,
D¹ and D² having meanings identical to or different from each other and M being hydrogen or an alkali metal;
K¹ is a group of the formula

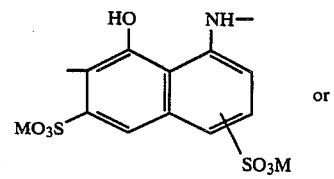

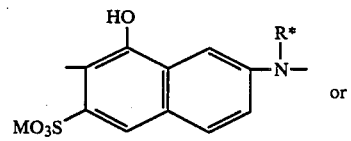

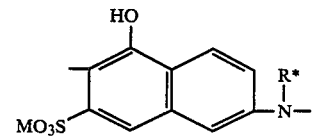

in which
M is hydrogen or an alkali metal,
R* is ethyl or hydrogen or methyl and the one —SO₃M group in the formula

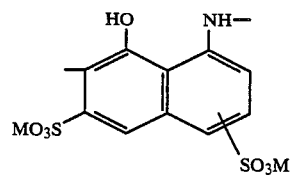

is in the meta- or para-position relative to the NH group;
K² is a group of the formula

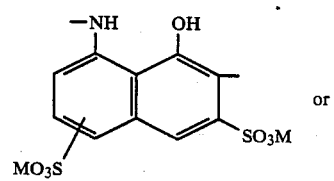

-continued

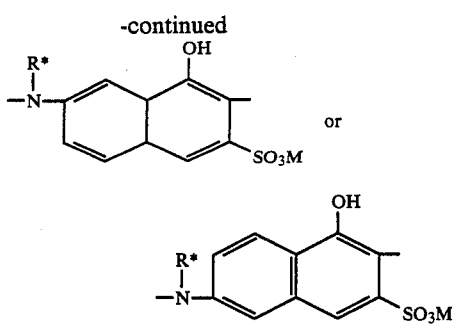

in which
M and R* have the abovementioned meanings and the one —SO₃M group in the formula

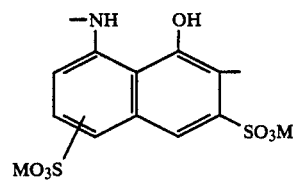

is in the meta- or para-position relative to the NH group, $K^1$ and $K^2$ having a meaning identical to each other or different from each other;

R is carboxy or carbamoyl;

one of the sulfo and carboxy groups in the radicals R, $D^1$, $D^2$, $K^1$ and $K^2$ forms an anion equivalent to the pyridinium cation, and X is a vinyl group or the β-sulfatoethyl or the β-chloroethyl group, the X's being the same or different from each other;

or applying a 1:1-copper complex disazo compound of a compound of the formula

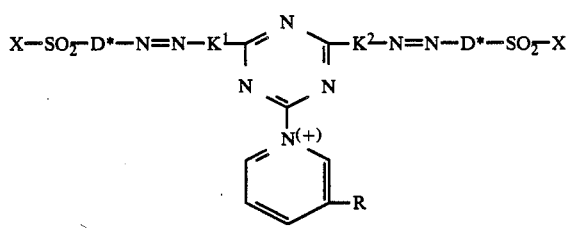

in which X and R have the meanings mentioned above, the two D*'s have meanings identical to each other or different from each other and have one of the meanings of $D^1$ or $D^2$ as set forth above, yet subject to the proviso that one or both the D*'s denote a benzene ring which is substituted in the ortho-position relative to the azo group by an oxy group to which the copper atom is complex-bonded and which, apart from the —SO₂—X group shown and this oxy group, is unsubstituted or substituted by methyl, ethyl, methoxy, sulfo, carboxy, chlorine or bromine, or is a naphthalene ring which is substituted in the ortho-position relative to the azo group by an oxy group to which the copper atom is complex-bonded, and $K^1$ and $K^2$ have one of the meanings mentioned above, yet subject to the proviso that one of the naphtholic hydroxy groups of $K^1$ or $K^2$ or both are complex-bonded as oxy group(s) to the copper atom;

in aqueous solution to said material and fixing a said compound on said material by allowing it to act on the material from the aqueous solution at a pH value of between 4 and 8 and at a temperature between 100° and 150° C.

2. A process according to claim 1, in which $D^1$ and $D^2$ have meanings identical to each other or different from one another and each is a benzene ring which is unsubstituted or substituted by 1 or 2 substituents which are selected from the set of substituents consisting of 2 methoxy groups, 1 methyl group, 1 chlorine atom and 1 bromine atom, one of these substituents being bonded in the ortho-position relative to the azo group, or is a naphthalene ring which is unsubstituted or is substituted by sulfo in the ortho-position relative to the azo group.

3. A process according to claim 1, wherein the disazo compound applied and fixed on the material is a disazo compound of the formula

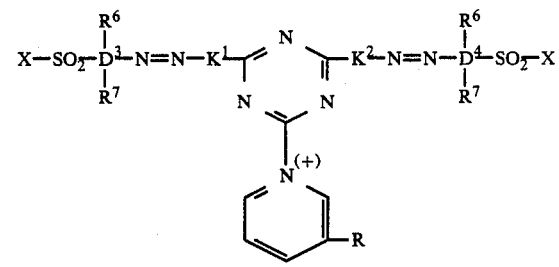

in which
$D^3$ and $D^4$ have meanings identical to each other or different from each other and each denotes a benzene ring or a naphthalene ring, $R^6$ is, in the case where $D^3$ and $D^4$ denotes a benzene ring, hydrogen, methyl, ethyl, methoxy, ethoxy, sulfo, carboxy, chlorine or bromine in the ortho-position relative to the azo group, or, in the case where $D^3$ or $D^4$ denotes a naphthalene ring, hydrogen or sulfo in the ortho-position relative to the azo group, and $R^7$ is hydrogen, methyl, ethyl, methoxy, ethoxy, nitro or sulfo.

4. A process according to claim 1, wherein the copper-complex disazo compound applied and fixed on the material is a compound conforming to the formula

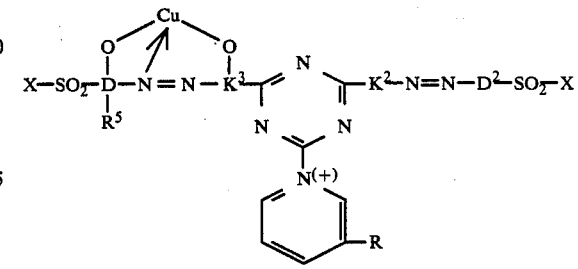

in which
D denotes a benzene ring or a naphthalene ring on each of which the metal-complexing oxy group is bonded in the ortho-position relative to the azo group, $R^5$ is hydrogen, methyl, ethyl, methoxy, ethoxy, sulfo or chlorine, if D denotes a benzene ring, or $R^5$ is hydrogen, if D denotes a naphthalene ring, R, $D^2$, $K^2$ and X are defined as in claim 1, and K³ is a group of the formula

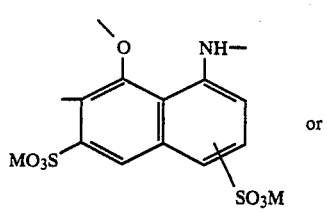

or

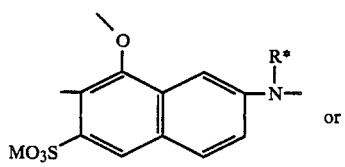

or

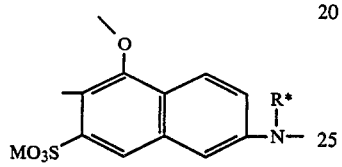

in which R* and M are defined as in claim 1.

5. A process according to claim 1, wherein the copper-complex disazo compound applied and fixed on the material is a compound conforming to the formula

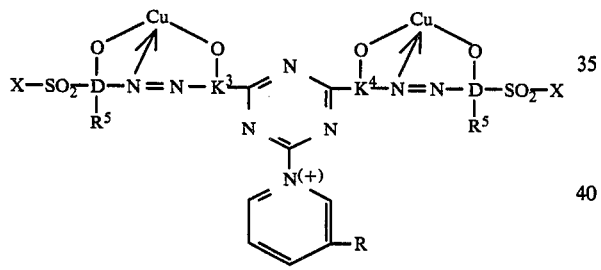

in which

D denotes a benzene ring or a naphthalene ring on each of which the metal-complexing oxy group is bonded in the ortho-position relative to the azo group, R⁵ is hydrogen, methyl, ethyl, methoxy, ethoxy, sulfo or chlorine, if D denotes a benzene ring, or R⁵ is hydrogen, if D denotes a naphthalene ring, the two D's and two R⁵'s having a meaning identical to or different from each other, K³ is a group of the formula

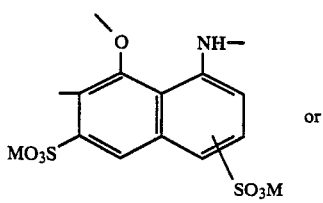

or

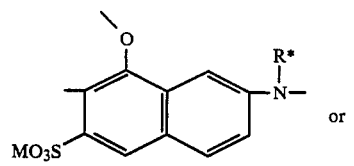

or

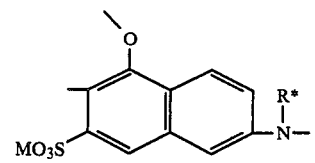

and
K⁴ is a group of the formula

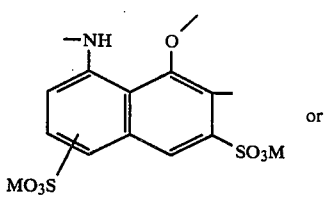

or

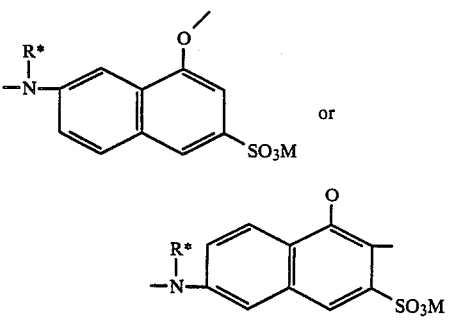

K³ and K⁴ having meanings identical to each other or different from each other.

6. A process according to claim 1, wherein X is β-sulfatoethyl.

7. A process according to claim 3, wherein X is β-sulfatoethyl.

8. A process according to claim 4, wherein X is β-sulfatoethyl.

9. A process according to claim 5, wherein X is β-sulfatoethyl.

10. The process as claimed in claim 1, wherein the hydroxy-containing fiber material is a cellulose fiber material.

11. The process as claimed in claim 1, wherein the dyeing is carried out at a pH value between 5 and 7.

12. The process as claimed in claim 11, wherein the fiber material used is a cellulose fiber/polyester fiber blend or a cellulose fiber/cellulose triacetate fiber blend.

13. The process as claimed in claim 12, wherein a disperse dye is also present.

* * * * *